(12) United States Patent (10) Patent No.: US 12,609,736 B2

Eun (45) Date of Patent: Apr. 21, 2026

(54) DECODING WITH SELECTIVE ITERATIVE DECODING SKIPPING

(71) Applicant: SAMSUNG ELECTRONICS CO., LTD., Suwon-si (KR)

(72) Inventor: Yoochang Eun, Suwon-si (KR)

(73) Assignee: SAMSUNG ELECTRONICS CO., LTD., Suwon-si (KR)

(\*) Notice: Subject to any disclaimer, the term of this patent is extended or adjusted under 35 U.S.C. 154(b) by 64 days.

(21) Appl. No.: 18/498,778

(22) Filed: Oct. 31, 2023

(65) Prior Publication Data

US 2024/0154649 A1 May 9, 2024

(30) Foreign Application Priority Data

Nov. 1, 2022 (KR) ........................ 10-2022-0143956

(51) Int. Cl.
H04B 7/0413 (2017.01)
H04L 1/00 (2006.01)

(52) U.S. Cl.
CPC ........... H04B 7/0413 (2013.01); H04L 1/005 (2013.01); H04L 1/0063 (2013.01)

(58) Field of Classification Search
CPC .......... H03M 13/1102; H03M 13/2957; H04B 7/0413; H04L 1/005; H04L 1/0051; H04L 1/0054; H04L 1/0057; H04L 1/0061; H04L 1/0063; H04L 1/0064
See application file for complete search history.

(56) References Cited

U.S. PATENT DOCUMENTS

| | | | |
|---|---|---|---|
| 6,526,531 B1 | 2/2003 | Wang | |
| 8,744,018 B2 | 6/2014 | Chen et al. | |
| 8,839,079 B2 | 9/2014 | Chen et al. | |
| 10,312,937 B2 | 6/2019 | Loncke et al. | |
| 10,411,833 B2 | 9/2019 | Sun et al. | |
| 10,419,024 B2 | 9/2019 | Xiong et al. | |

(Continued)

FOREIGN PATENT DOCUMENTS

CN 108736900 11/2018

OTHER PUBLICATIONS

Cho, E., et al., "Early Termination Method for LDPC Codes Based on Majority-Voted Codeword", In International Conference of Information and Communication Technology Convergence, Oct. 21, 2020, DOI: 10.1109/ICTC49870.2020.9289302, 5 pages.

(Continued)

*Primary Examiner* — David B Lugo
(74) *Attorney, Agent, or Firm* — Morgan, Lewis & Bockius LLP

(57) ABSTRACT

An operating method of a decoder device, included in a reception device of a multiple input multiple output (MIMO) communication system, includes receiving a transport block including a plurality of code blocks from a transmission device, performing sequential decoding on the plurality of code blocks and performing iterative decoding by up to a maximum iteration number on each of the plurality of code blocks, monitoring a result of the sequential decoding in real time to generate a count value of a decoding fail number, and determining whether to activate selective skipping of the iterative decoding or selective skipping of the sequential decoding on one or more remaining code blocks of the transport block, based on the count value.

20 Claims, 18 Drawing Sheets

(56) References Cited

U.S. PATENT DOCUMENTS

| 10,567,008 B2 | 2/2020 | Hussain et al. |
| 11,146,363 B2 | 10/2021 | Cao et al. |
| 2013/0132806 A1 | 5/2013 | Vummintala et al. |
| 2014/0053049 A1* | 2/2014 | Chen .................... H04L 1/0066 714/E11.032 |
| 2020/0120606 A1* | 4/2020 | Beale ................... H04W 76/28 |
| 2021/0028795 A1* | 1/2021 | Graumann ........ H03M 13/3715 |
| 2022/0399965 A1* | 12/2022 | Xu ........................ H04L 1/1887 |

OTHER PUBLICATIONS

Chen, Y., et al., "A Channel-Adaptive Early Termination strategy for LDPC decoders", In IEEE Workshop on Signal Processing Systems, Nov. 17, 2009, DOI: 10.1109/SIPS.2009.5336256, 7 pages.

Zhang, Z., et al., "A New Early Termination Strategy for QC-LDPC Codes Based on the Layered Message Passing Decoding", In AASRI Winter International Conference of Engineering and Technology, 2013, DOI: 10.2991/WIET-13.2013.39, 5 pages.

* cited by examiner

Figure 7:
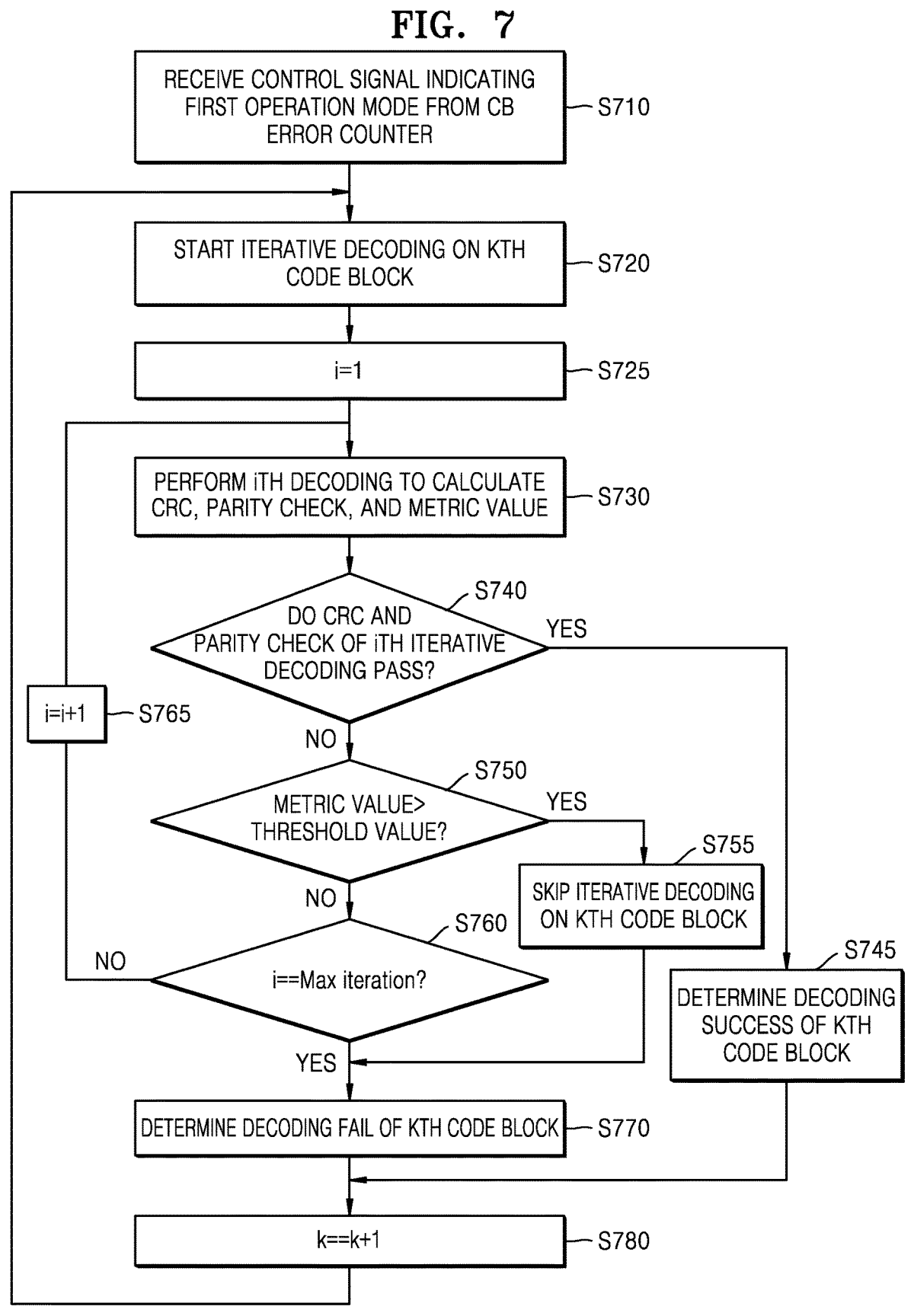

RECEIVE CONTROL SIGNAL INDICATING FIRST OPERATION MODE FROM CB ERROR COUNTER — S710

START ITERATIVE DECODING ON KTH CODE BLOCK — S720 i=1 — S725

PERFORM iTH DECODING TO CALCULATE CRC, PARITY CHECK, AND METRIC VALUE — S730

S740
DO CRC AND PARITY CHECK OF iTH ITERATIVE DECODING PASS?

YES

NO i=i+1 — S765

S750
METRIC VALUE> THRESHOLD VALUE?

YES

NO

SKIP ITERATIVE DECODING ON KTH CODE BLOCK — S755

S760
i==Max iteration?

NO

YES

S745
DETERMINE DECODING SUCCESS OF KTH CODE BLOCK

DETERMINE DECODING FAIL OF KTH CODE BLOCK — S770 k==k+1 — S780

RECEIVE CONTROL SIGNAL INDICATING
SECOND OPERATION MODE FROM
CB ERROR COUNTER — S810

SKIP DECODING ON OTHER CODE BLOCKS
EXCEPT DECODING-COMPLETED
CODE BLOCKS AMONG CODE BLOCKS — S820

Throughput (CR=0.917, 100CBs, AWGN)

DECODING WITH SELECTIVE ITERATIVE DECODING SKIPPING

CROSS-REFERENCE TO RELATED APPLICATION

This application is based on and claims priority under 35 U.S.C. § 119 to Korean Patent Application No. 10-2022-0143956, filed on Nov. 1, 2022, in the Korean Intellectual Property Office, the disclosure of which is incorporated by reference herein in its entirety.

TECHNICAL FIELD

This disclosure relates generally to a decoder for decoding a plurality of code blocks, and more particularly to such a decoder configured for use in a wireless communications system.

DISCUSSION OF RELATED ART

To satisfy the demand for increased wireless data traffic after the commercialization of 4th generation (4G) communication systems, research for developing 5th generation (5G) and pre-5G communication systems has been conducted (both often referred to as a new radio (NR) system), which are based on the Third Generation Partnership (3GPP) standard.

To attain a high data transmission rate, a 5G communication system has been implemented in a super-high frequency (mmWave) band (for example, a 28 GHz band or a 39 GHz band). To reduce the path loss of radio waves and increase a maximum radio frequency (RF) link distance for acceptable performance in a super-high frequency band, 5G communication systems require technologies such as beamforming, massive multiple input multiple output (MIMO), full dimensional MIMO (FD-MIMO), array antenna, analog beamforming, hybrid beamforming, and large scale antenna.

SUMMARY

Embodiments of the inventive concept provide an operating method of a decoder and an electronic device which, while sequentially decoding a plurality of code blocks included in a transport block, monitors a first count value corresponding to a total decoding fail number of previous code blocks and a second count value corresponding to a continuous decoding fail number of the previous code blocks, determines whether to activate a mode of permissible early termination of iterative decoding on each code block, based on the first count value and the second count value, or determines whether to activate selective skipping of subsequent decoding on remaining code blocks of the transport block on which decoding has not been attempted.

According to an aspect of the inventive concept, there is provided an operating method of a decoder device included in a reception device of a multiple input multiple output (MIMO) communication system, the operating method including receiving a transport block including a plurality of code blocks from a transmission device, performing sequential decoding on at least some of the plurality of code blocks, where the sequential decoding includes iterative decoding on individual code blocks of the plurality of code blocks up to a maximum number of decoding iterations per code block, monitoring a result of the sequential decoding in real time to generate a count value of a decoding fail number, and determining whether to activate selective skipping of subsequent iterative decoding and/or selective skipping of subsequent sequential decoding on one or more remaining code blocks of the transport block, based on the count value.

According to another aspect of the inventive concept, there is provided a decoder device included in a reception device of a MIMO communication system, the decoder device including an ECC decoder configured to receive a transport block including a plurality of code blocks through the reception device, perform sequential decoding on at least some of the plurality of code blocks, the sequential decoding including iterative decoding by up to a maximum iteration number on individual code blocks of the plurality of code blocks, a cyclic redundancy check (CRC) and parity check (PC) checker configured to receive an output of the ECC decoder and perform CRC and PC to determine a decoding result on each code block, and an error counter configured to monitor the decoding result output from the CRC and PC checker to generate a count value of a decoding fail number of code blocks, and an early termination checker configured to receive the count value from the error counter to determine a first operation mode for selectively skipping the iterative decoding of the ECC decoder or a second operation mode for selectively skipping the sequential decoding.

According to another aspect of the inventive concept, there is provided a wireless communication system comprises a transmitting device configured to encode data based on one of a turbo code and a low density parity check (LDPC) code, and deserialize a serial bit string of the encoded data, and a receiving device configured to receive a transport block including a plurality of code blocks from the transmitting device, perform sequential decoding on at least. some of the plurality of code blocks; the sequential decoding including iterative decoding on individual code blocks of the plurality of code blocks up to a maximum number of decoding iterations per code block, monitor a result of the sequential decoding in real time to generate a count value of a decoding fail number, and determine whether to activate selective skipping of subsequent iterative decoding and/or selective skipping of subsequent sequential decoding on one or more remaining code blocks of the transport block, based on the count value.

BRIEF DESCRIPTION OF THE DRAWINGS

Embodiments will be more clearly understood from the following detailed description taken in conjunction with the accompanying drawings in which:

FIG. 1B illustrates an example of a transmission block including a plurality of code blocks;

FIG. 7 is a flowchart illustrating an operating method of a decoding circuit based on a first operation mode, according to embodiments;

DETAILED DESCRIPTION OF EMBODIMENTS

Hereinafter, embodiments will be described in detail with reference to the accompanying drawings.

Figure 1A:
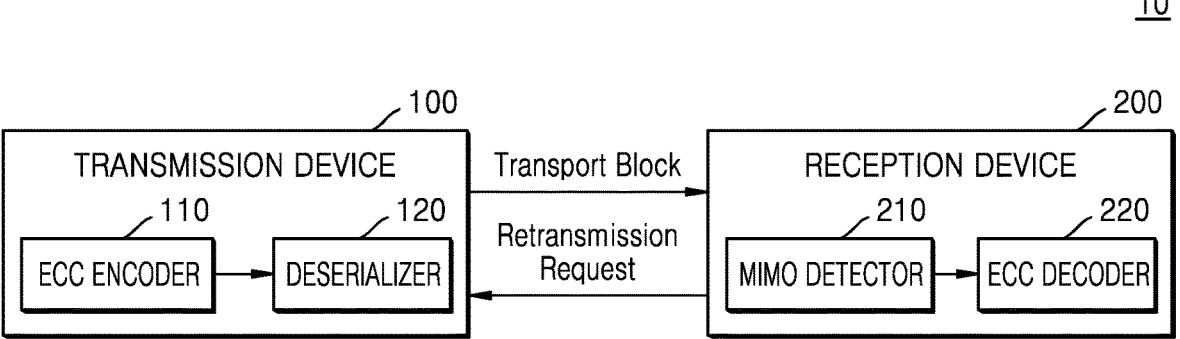
FIG. 1A illustrates a wireless communication system according to an embodiment.

FIG. 1A illustrates a wireless communication system 10 according to an embodiment. The wireless communication system 10 may include a transmission device 100 and a reception device 200. The transmission device 100 may be a device for encoding data and transmitting signals corresponding to the encoded data through a wireless channel. (Basic transmitter/receiver components such as a transceiver front end, antennas, etc., are omitted in FIG. 1A for clarity.) For example, when the signal is an uplink signal, the transmission device 100 may correspond to user equipment (UE), and the reception device 200 may correspond to a base station. As another example, when the signal is a downlink signal, the transmission device 100 may correspond to a base station, and the reception device 200 may correspond to a UE.

According to an embodiment, the transmission device 100 may include an error correction code (ECC) encoder 110 and a deserializer 120. The ECC encoder 110 may encode data based on a turbo code technique or a low density parity check (LDPC) technique. The deserializer 120 may deserialize a serial bit string of the encoded data. The deserializer 120 may receive a bit string of an encoded code word from the ECC encoder 110 and may deserialize the serial bit string by a multi-input number. For example, the deserializer 120 may deserialize the serial bit string to respectively map deserialized bit strings to a plurality of layers. The plurality of layers may correspond to a rank of each of multiple input multiple output (MIMO). For example, when the wireless communication system 10 is based on 4×4 MIMO, the serial bit string may be deserialized into four bit strings.

According to an embodiment, the reception device 200 may include a MIMO detector 210 and an ECC decoder 220. The MIMO detector 210 may detect a MIMO signal. The MIMO detector 210 may generate soft-decision information in a process of detecting the MIMO signal so as to perform error correction by using the ECC decoder 220. For example, the MIMO detector 210 may be based on a linear detection technique using minimum mean squared error (MMSE), zero-forcing (ZF), and matched filter (MF), or may be based on a nonlinear detection technique using maximum likelihood (ML). For example, the ECC decoder 220 may be a decoder having a parallel structure based on a maximum A posteriori (MAP) algorithm.

Figure 1B:
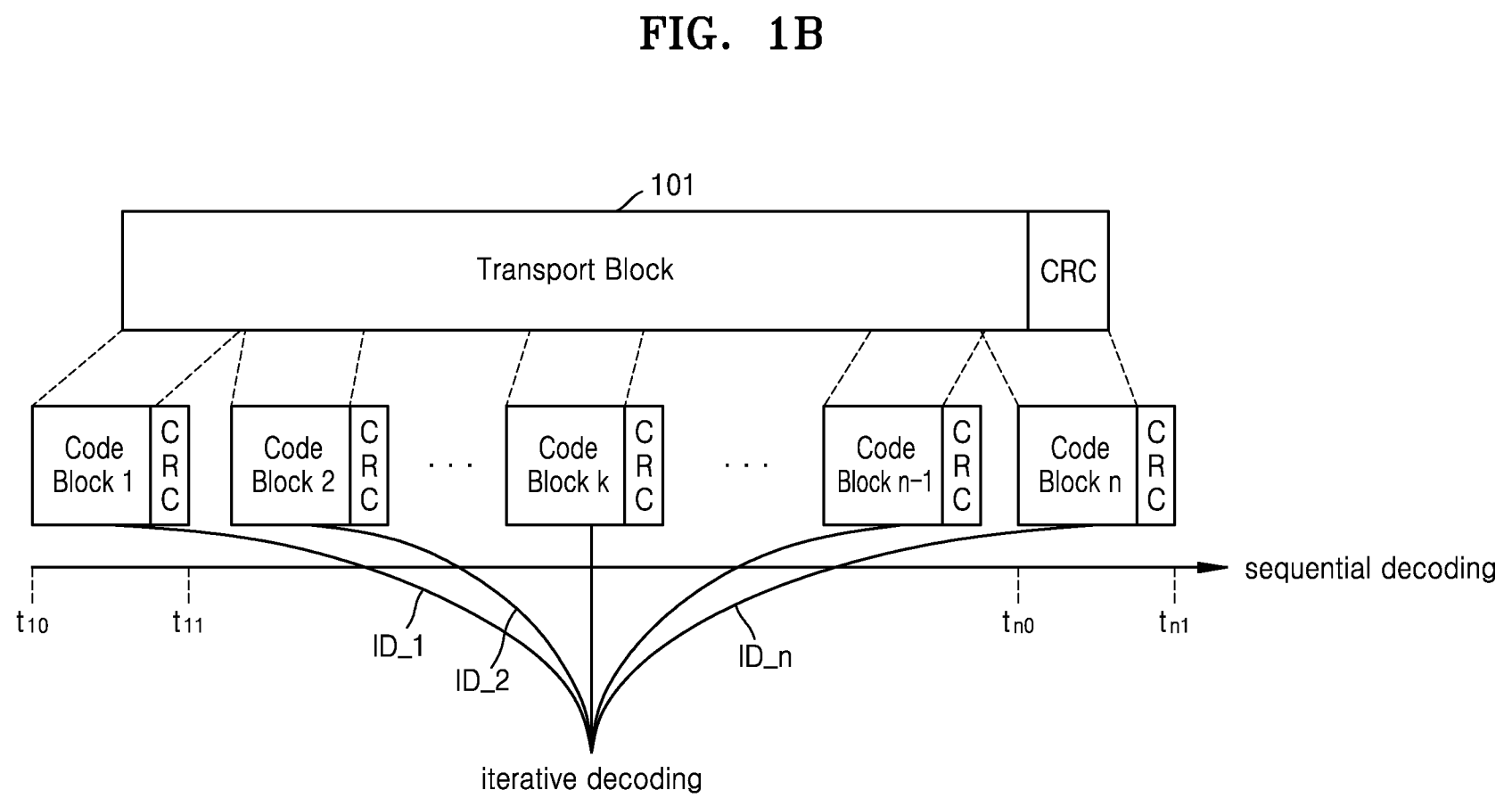

FIG. 1B illustrates an example of a transmission block including a plurality of code blocks.

Referring to FIG. 1B, a transport block may include a plurality of code blocks. The transport block may correspond to data words which are to be transmitted to the reception device 200. The transmission device 100 may add a cyclic redundancy check (CRC) bit to the transport block. The CRC bit may include bits obtained by performing a CRC operation on the transport block. The transmission device 100 may add the CRC bit to the transport block to generate a code word.

The transmission device 100 may segment the code word into a plurality of code blocks, based on an input size of the ECC encoder 110. The transmission device 100 may calculate a CRC bit of each of the plurality of code blocks and may add the calculated CRC bit to each of the plurality of code blocks. The ECC encoder 110 of the transmission device 100 may perform encoding for each block including an individual code block and a CRC bit added thereto. The reception device 200 may sequentially receive encoded first to nth code blocks (Code Block 1) to (Code Block n) from the transmission device 100.

The reception device 200 may receive the transport block and may perform both sequential decoding of code blocks, and iterative decoding of individual ones of the code blocks. Thus, the sequential decoding includes the iterative decoding. This may be understood in the illustration of FIG. 1B. In terms of a transport block, 101, the sequential decoding may be decoding that from a first code block (Code Block 1) at time t10 up to an nth code block (Code Block n) at a time tn1. The iterative decoding may be an operation of performing decoding of an individual code block in an iterative fashion up to maximum number of iterations per code block (decoding by a "maximum iteration number"), in a process of sequentially decoding the first to nth code blocks (Code Block 1) to (Code Block n). For example, an iterative decoding operation ID_1 may be performed on Code Block 1 between times t10 and t11, which may be followed by an iterative decoding operation ID_2 on Code Block 2, and so on, until Code Block n is iteratively decoded with an iterative decoding operation ID_n between times tn0 to tn1. (In this example, the iterative decoding of a given code block is assumed to include a CRC operation after the iterations are completed.) As an example, if n is 100, and the maximum iteration number is 10, then if there is no skipping of code blocks, the reception device 200 may sequentially decode, for one transport block 101, 100 code blocks and may perform decoding a maximum of 10 times in decoding each code block. Thus, the reception device 200 may decode the transport block by performing decoding a maximum of 1,000 times.

Figure 2:
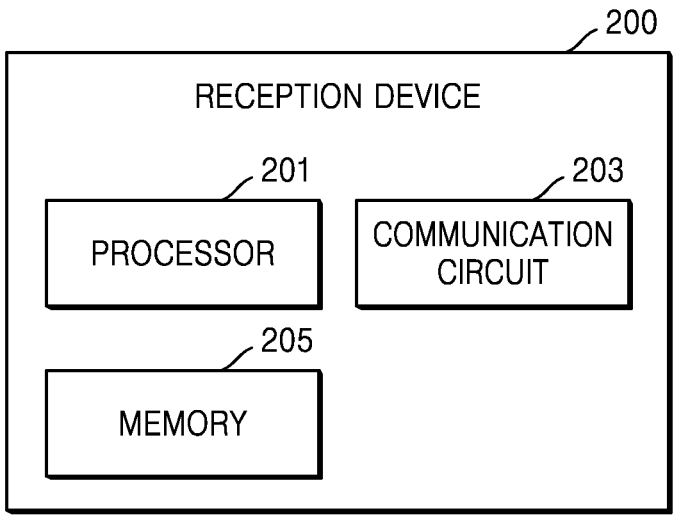
FIG. 2 is a block diagram of a reception device according to embodiments.

FIG. 2 is a block diagram of a reception device 200 according to embodiments.

Referring to FIG. 2, the reception device 200 may include a processor 201, a communication circuit 203, and a memory 205.

The processor 201 may control overall operations of the reception device 200. For example, the processor 201 may transmit and receive signals through the communication circuit 203. Also, the processor 201 may write data to or read data from the memory 205. A portion of the communication circuit 203 and the processor 201 may be referred to as a communication processor.

The communication circuit 203 may perform functions for transmitting and receiving a signal through a wireless channel. For example, the communication circuit 203 may perform a conversion function between a baseband signal and a bit string, based on a physical layer protocol of a system. For example, when the reception device 200 is a bidirectional communication device, in transmitting data, the communication circuit 203 may encode and modulate a transmission bit string to generate complex symbols. In the receive path, the communication circuit 203 may recover a reception bit string by demodulating and decoding the baseband signal. On transmit, the communication circuit 203 may up-convert the baseband signal into a radio frequency (RF) band signal and may transmit the RF band signal through an antenna. On receive, the communication circuit 203 may down-convert the RF band signal, received through the antenna, into the baseband signal. For example, the communication circuit 203 may include a transmission filter, a reception filter, an amplifier, a mixer, an oscillator, a digital-to-analog converter (DAC), and an analog-to-digital converter (ADC). The communication circuit 203 may perform beamforming. The communication circuit 203 may apply a beamforming weight to a signal, so as to assign directionality to the signal which is to be transmitted or received. According to an embodiment, the communication circuit 203 may receive a MIMO signal obtained through spatial multiplexing by the MIMO detector 210 and may obtain an error-corrected bit string through the ECC decoder 220.

The memory 205 may store data, such as a basic program, an application program, and setting information, for an operation of the reception device 200. The memory 205 may be configured with a volatile memory, a non-volatile memory, or a combination of the volatile memory and the non-volatile memory. The memory 205 may provide data stored therein, based on a request of the processor 201.

Figure 3:
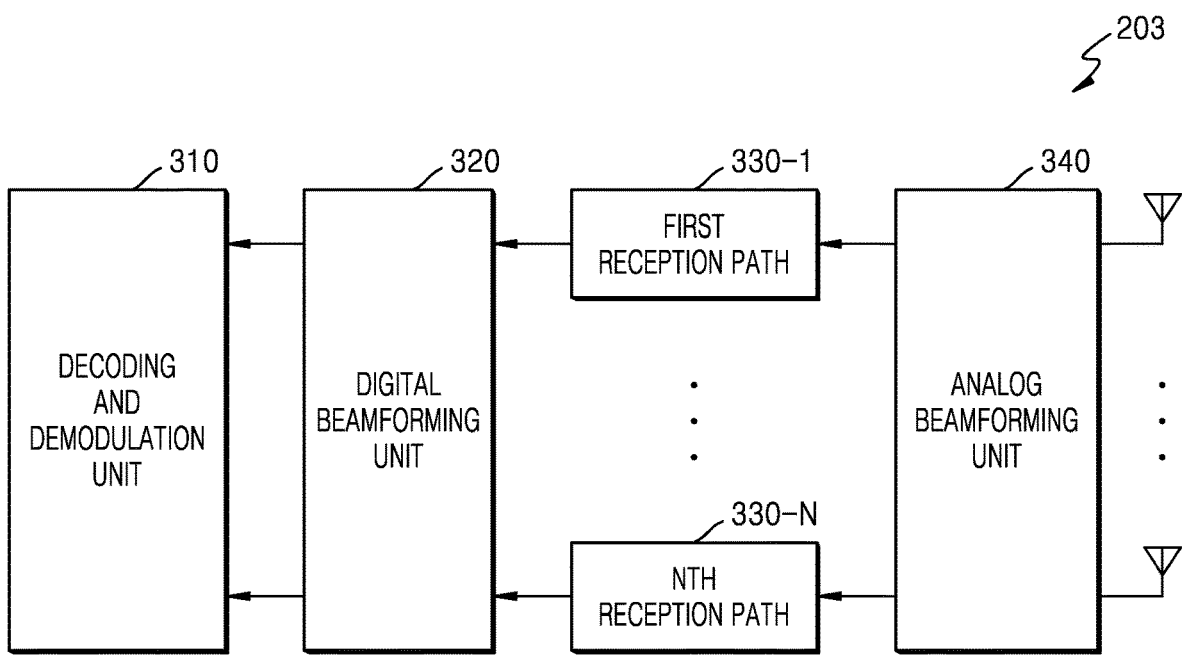
FIG. 3 is a detailed block diagram of a communication circuit according to embodiments.

FIG. 3 is a detailed block diagram of a communication circuit 203 according to embodiments. The communication circuit 203 may include a decoding and demodulation unit 310, a digital beamforming unit 320, first to Nth reception paths 330-1 to 330-N, and an analog beamforming unit 340.

The decoding and demodulation unit 310 may perform channel decoding. An LDPC code, a convolution code, a polar code, and/or a turbo code may be used for channel decoding. Note that the decoding and demodulation unit 310 may correspond to the ECC decoder 220 of the reception device 200 in FIG. 1.

The digital beamforming unit 320 may multiply beamforming weights by analog signals received through the first to Nth reception paths 330-1 to 330-N. Here, the beamforming weights may be used for changing an amplitude and a phase of a signal. In this case, modulation symbols obtained through multiplexing based on a MIMO transmission technique may be received through the first to Nth reception paths 330-1 to 330-N.

The analog beamforming unit 340 may perform beamforming on the analog signal. The analog beamforming unit 340 may perform beamforming on an analog reception beam so as to receive the MIMO signal.

Each of the first to Nth reception paths 330-1 to 330-N may include a fast Fourier transform (FFT) calculator, an ADC, a cyclic prefix (CP) remover, and a serial-to-parallel converter, and a down converter. Each of the first to Nth reception paths 330-1 to 330-N may down-convert a received signal into a baseband frequency, remove a CP to generate a serial time domain baseband signal, convert the serial time domain baseband signal into parallel time domain signals, perform an FFT algorithm to generate N parallel frequency domain signals, and convert the parallel frequency domain signals into a sequence of modulated data symbols. Thus, the first to Nth reception paths 330-1 to

330-N may provide a plurality of streams, generated through digital beamforming, to an independent signal processor. However, based on an implementation method, some elements of the first to Nth reception paths 330-1 to 330-N may be used in common.

Figure 4:
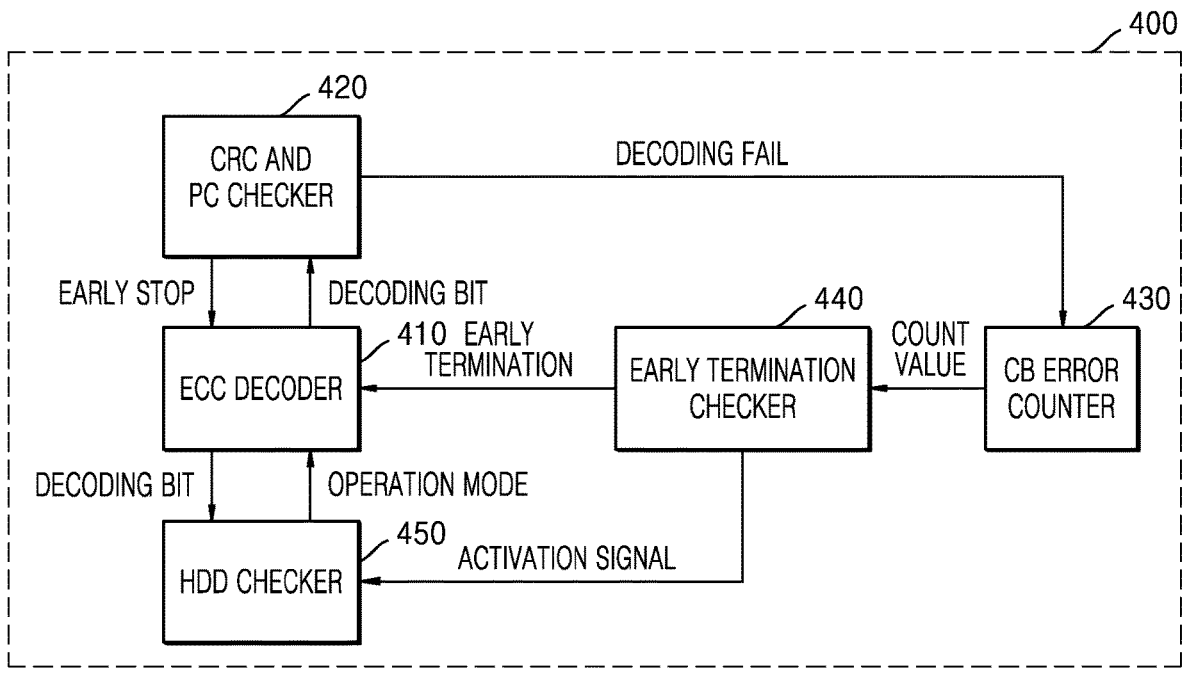
FIG. 4 is a block diagram of a decoding circuit according to embodiments.

FIG. 4 is a block diagram of a decoding circuit 400 according to embodiments.

Referring to FIG. 4, the decoding circuit 400 may correspond to at least some elements of the decoding and demodulation unit 310 of FIG. 3. The decoding circuit 400 may include an ECC decoder 410, a CRC and parity check (PC) checker 420, a code block (CB) error counter 430, an early termination checker 440, and a hard-decision difference (HDD) checker 450.

The ECC decoder 410 of the decoding circuit 400 may correspond to the ECC decoder 220 included in the reception device 200 of FIG. 1A. The ECC decoder 410 may perform sequential decoding on a plurality of code blocks. For example, the ECC decoder 410 may sequentially decode the plurality of code blocks included in a transport block. In a case in which each code block is decoded in a process of performing the sequential decoding, the ECC decoder 410 may perform iterative decoding. The ECC decoder 410 may provide a decoding output to the CRC and PC checker 420 and the HDD checker 450 whenever performing iterative decoding.

The CRC and PC checker 420 may receive the decoding output of the iterative decoding from the ECC decoder 410 to perform CRC check and parity check. For example, in a case where the ECC decoder 410 uses the LDPC technique, the ECC decoder 410 may use a parity check matrix (PCM), for parity check. The CRC and PC checker 420 may determine whether CRC bits match, based on a code word output from the ECC decoder 410, and may determine whether the parity check is satisfied, based on the PCM. Note that the parity check may be obtained in a decoding process of the ECC decoder 410 using any suitable method known to those of skill in the art. The CRC and PC checker 420 may transfer a response signal (for example, CRC pass or CRC fail), indicating whether a CRC check result is satisfied, to the ECC decoder 410.

The CRC and PC checker 420 may provide the ECC decoder 410 with a control signal indicating early stop. For example, although the ECC decoder 410 does not perform decoding on a specific code block up to a maximum iteration number, a code word of an ith (where i may be a natural number which is less than the maximum iteration number) iterative decoding result may pass CRC check or may pass parity check. In this case, it may be estimated that the specific code block is already successfully decoded, and the ECC decoder 410 may not need to perform iterative decoding up to the maximum iteration number. Therefore, when the CRC check and/or the parity check are/is satisfied, the CRC and PC checker 420 may generate the control signal indicating the early stop and may transfer the control signal to the ECC decoder 410. That is, the control signal indicating the early stop may be a signal for early terminating decoding without performing the decoding up to the maximum iteration number only when the decoding on the specific code block succeeds as the CRC check and/or the parity check are/is satisfied.

The ECC decoder 410 may provide the CB error counter 430 with a control signal indicating decoding fail. For example, the ECC decoder 410 may perform iterative decoding on an arbitrary specific code block by the maximum iteration number, but may receive a response signal indicating a fail of the CRC check from the CRC and PC checker 420. The ECC decoder 410 may determine that decoding fails despite iterative decoding performed on the arbitrary specific code block and may transmit a control signal indicating a decoding fail to the CB error counter 430 so as to monitor a decoding fail number of the plurality of code blocks configuring the transport block.

The CB error counter 430 may monitor a decoding fail number of the plurality of code blocks. For example, the CB error counter 430 may receive the control signal indicating the decoding fail from the ECC decoder 410 and may update the first count value and the second count value. The first count value may be a value for counting the total number of code blocks on which decoding has failed, in a process of decoding all of the plurality of code blocks configuring the transport block. The second count value may be a value for counting a continuous decoding fail number in a process of decoding the plurality of code blocks.

For example, it may be assumed that a decoding fail occurs in a fifth code block, a sixth code block, and an eighth code block while the ECC decoder 410 is decoding first to tenth code blocks. In this case, because decoding fails total three times (the fifth, sixth, and eighth code blocks) while the CB error counter 430 is performing decoding ten times up to the tenth code block from the first code block, the first count value may be stored as 3. The number of decoding which continuously fails while the CB error counter 430 is performing decoding ten times may be two (the fifth or sixth code blocks), but because decoding of the tenth code block on which last decoding is performed has succeeded, the second count value may be stored as 0. For example, the second count value may increase to 1 at a time at which decoding of the eighth code block fails, and the second count value may be again set to 0 at a time at which decoding of the ninth code block succeeds. As another example, the second count value may be 2 at a time at which the ECC decoder 410 performs decoding up to the sixth code block from the first code block. That is, the second count value may be initialized to 0 whenever a code block on which decoding succeeds appears. The CB error counter 430 may transfer the first count value and the second count value, which are a result of monitoring a decoding fail of the ECC decoder 410, to the early termination checker 440 of the ECC decoder 410.

The early termination checker 440 may receive the first count value and the second count value from the CB error counter 430 and may determine whether a first condition and a second condition for early termination are satisfied. The early termination checker 440 may early terminate sequential decoding on the plurality of code blocks configuring the transport block when the second condition is satisfied, or when the first condition is satisfied, the early termination checker 440 may early terminate iterative decoding on each of the plurality of code blocks to perform the early termination. The first condition may be a condition for activating a first operation mode of an operation mode of early termination. For example, the first condition may denote that the first count value is greater than a first threshold value or the second count value is greater than a second threshold value. The first operation mode may denote an operation mode of determining early give-up of iterative decoding performed for each of the plurality of code blocks. The early termination checker 420 may transmit a control signal, indicating the first operation mode in early termination, to the ECC decoder 410 in response to the first operation mode and may transmit an activation signal for activating the HDD checker 450 block. The ECC decoder 410 may provide a decoding bit to the HDD checker 450 in response to the control signal indicating the first operation mode received from the early termination checker 420. The DD checker 450 may receive the decoding bit from the ECC decoder 410 and may estimate whether a decoding result converges based on the decoding bit, thereby determining whether to give up the iterative decoding.

The early termination checker 440 may receive the first count value and the second count value from the CB error counter 430 and may determine whether the second condition is satisfied. The second condition may be a condition for activating a second operation mode of the operation mode of the early termination. For example, the second condition may denote that the first count value is greater than a third threshold value or the second count value is greater than a fourth threshold value. In this case, the third threshold value may be greater than the first threshold value, and the fourth threshold value may be greater than the second threshold value. The second operation mode may be a mode which skips decoding of a code block on which decoding is not yet performed, even before decoding on the plurality of code blocks is completed. The early termination checker 420 may transmit a control signal, indicating the second operation mode in the early termination, to the ECC decoder 410 in response to the second operation mode. Comparing the first operation mode, the early termination checker 440 may bypass the transmission of the activation signal for activating the HDD checker 450 block. The first operation mode and the second operation mode will be described below in detail.

In the embodiment described above, each of the early termination checker 440 and the CB error counter 430 is illustrated as a separate block, but is not limited thereto. According to various embodiments, the CB error counter 430 may be omitted, and thus, the early termination checker 440 may receive a CRC result and/or a parity check result from the CRC and PC checker 420, and based thereon, may perform a function of monitoring the first count value and the second count value.

Figure 5:
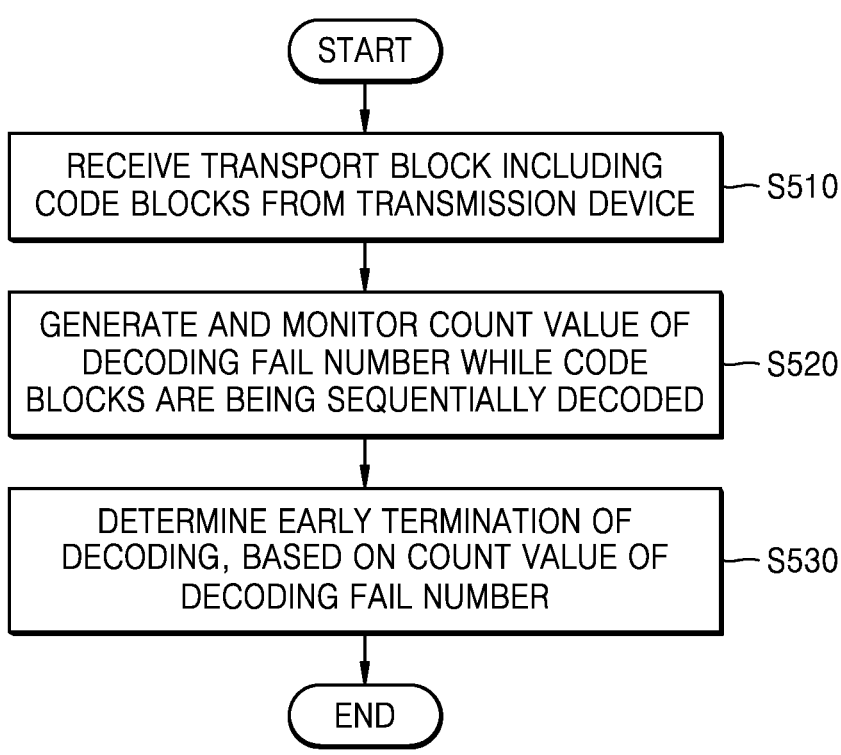
FIG. 5 is a flowchart illustrating an operating method of a reception device, according to embodiments.

FIG. 5 is a flowchart illustrating an operating method of the reception device 200, according to embodiments.

Referring to FIG. 5, in operation S510, the reception device 200 may receive a transport block including a plurality of code blocks from the transmission device 100. For example, the plurality of code blocks may be encoded based on the LDPC technique.

In operation S520, the reception device 200 may generate and monitor a count value of a decoding fail number, in real time, while the plurality of code blocks are being sequentially decoded. Herein, a "decoding fail number" may be a number corresponding to a number of code blocks upon which decoding has failed. In one example, the decoding fail number is a total number of code blocks of the transport block with failed decoding. In another example, the decoding fail number is a number of successive (consecutive) code blocks of which decoding has failed. The reception device 200 may perform sequential decoding on the plurality of code blocks by using the ECC decoder 410. In this case, the ECC decoder 410 may be based on iterative decoding in decoding one code block. The ECC decoder 410 may perform decoding on a specific code block up to a maximum iteration number, but may fail in CRC check and/or parity check to fail in decoding the specific code block. The CB error counter 430 may receive a sequential decoding result of the plurality of code blocks in real time to update a first count value representing a total decoding fail number (e.g., a summation of failed decoding attempts on previous coding blocks) and a second count value representing a continuous decoding fail number. The total decoding fail number may equal a total number of coding blocks of the transport block upon which decoding has failed. These coding blocks may be referred to as "decoding-attempted code blocks". The continuous decoding fail number may be a number of successive (consecutive) coding blocks upon which decoding has failed, including the most recent failure. Note that as soon as decoding of a coding block succeeds, the continuous decoding fail number may be reset to zero.

In operation S530, the reception device 200 may determine the early termination of decoding, based on a count value of a decoding fail number. The early termination checker 440 of the ECC decoder 410 may determine early termination, based on the first count value and the second count value. The early termination may be for terminating an operation of the ECC decoder 410 early, and may include a first operation mode and a second operation mode. The first operation mode may denote a mode of skipping remaining decoding iterations up to a predetermined maximum iteration number while a code block is being individually decoded, (a mode in which selective skipping of subsequent iterative decoding is activated) and the second operation mode may denote a mode of skipping decoding on remaining code blocks of the transport block before decoding attempts on all of the plurality of code blocks, in other words, despite there being code blocks on which decoding has not been attempted. In other words, the second mode may be a mode that activates skipping of subsequent sequential decoding (all decoding is skipped for coding blocks upon which decoding has not yet been attempted). Note that in the first mode, skipping of subsequent iterative coding may be understood as "selective skipping" because, for a given coding block, if a matrix value (discussed below) is determined to be above a threshold value prior to a time at which an allocated maximum number of iterations has occurred, then remaining iterations (up until the maximum number) may be skipped, and the given coding block may be deemed a coding block with a decoding fail.

Figure 6:
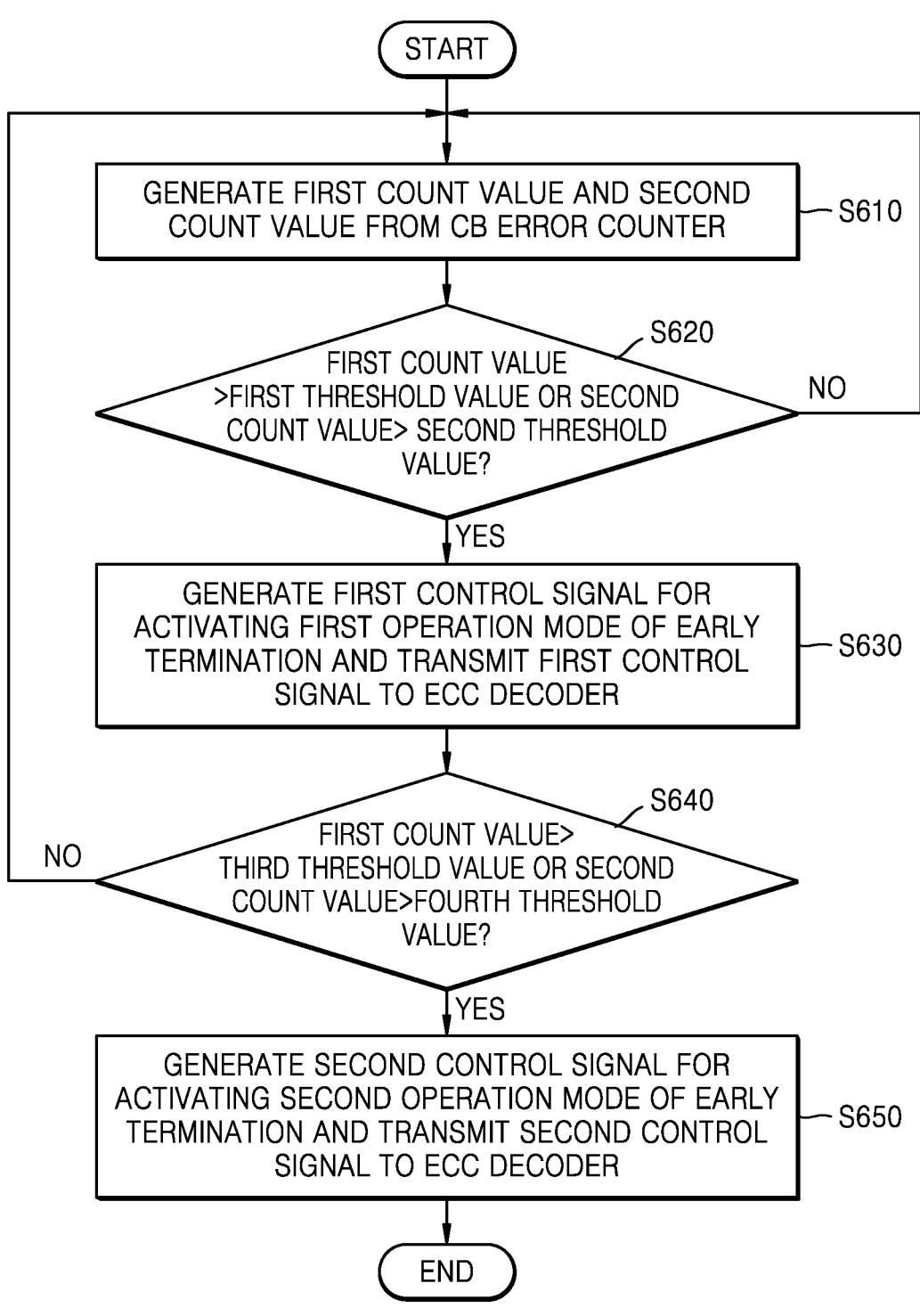
FIG. 6 is a flowchart illustrating an operating method of an early termination checker, according to embodiments.

FIG. 6 is a flowchart illustrating an operating method of the early termination checker 440, according to embodiments.

Referring to FIG. 6, in operation S610, the early termination checker 440 may generate a first count value and a second count value from the CB error counter 430. The first count value may represent a total decoding fail number in decoding of a code block when the ECC decoder 410 performs sequential decoding on a plurality of code blocks. The second count value may represent a continuous decoding fail number up to a current time (e.g., of an attempted decoding on a current code block) when the ECC decoder 410 performs the sequential decoding on the plurality of code blocks. For example, when decoding on a next code block succeeds after a number of continuous decoding fails, the second count value may be reset to 0. On the other hand, the first count value representing a total decoding fail number may be maintained when the ECC decoder 410 succeeds in decoding of a code block and may increase when the ECC decoder 410 fails in decoding of the code block. The CB error counter 430 may update the first count value and the second count value whenever receiving a sequential decoding result of the plurality of code blocks and may provide an updated first count value and an updated second count value to the early termination checker 440.

In operation S620, the early termination checker 440 may determine whether the first count value is greater than a first threshold value or the second count value is greater than a second threshold value. That is, it may be considered that the early termination checker 440 decreases the number of iterative decoding performed on each code block on the basis of a first operation mode, which is a mode of the early termination, in a case where the number of code blocks, on which decoding fails in a sequential decoding process of the plurality of code blocks, increases by a certain number because a wireless channel is degraded, or code blocks on which decoding fails continuously occur. This may be because most of the decoding which fails due to a channel degradation may be performed by using a retransmission packet based on a hybrid auto retransmission request (HARQ) and soft-combining of a decoding fail packet, and thus, even when a decoding fail increases slightly, a power gain may be obtained without performance loss, based on the HARQ. Also, this may be because unexpected delay may occur in a process of reading or writing data by using blocks of the reception device 200, and thus, when iterative decoding is performed by a maximum iteration number for each code block, a decoding termination time allocated to a transport block is not observed, causing an operation error of the reception device 200.

When the first count value is greater than the first threshold value or the second count value is greater than the second threshold value, the early termination checker 440 may return to operation S610 again and may stand by a decoding result of a next-sequence code block.

In operation S630, the early termination checker 440 may generate a first control signal for activating the first operation mode of the early termination and may transmit the first control signal to the ECC decoder 410. The first operation mode may be a mode where iterative decoding of an individual code block is skipped without being repeated up to the maximum iteration number. For example, the first control signal may be generated at a time at which a decoding attempt for a 50th code block of the transport block has been completed, in a process of sequentially decoding 100 code blocks. In response to the first control signal, the ECC decoder 410 may perform selective skipping of iterative decoding up to the maximum iteration number from decoding of a $51^{st}$ code block (discussed below with reference to FIG. 7), and thereby, may determine a decoding fail of a corresponding code block in the middle of the iterative decoding and may skip iterative decoding corresponding to remaining permissible iterations of a maximum iteration number for the $51^{st}$ block. A selective skipping of iterative decoding based on the first operation mode of operation S630 will be described below with reference to FIG. 7.

In operation S640, the early termination checker 440 may determine whether the first count value is greater than a third threshold value or the second count value is greater than a fourth threshold value. That is, because a wireless channel is rapidly degraded, the number of code blocks on which decoding fails may greatly increase in a sequential decoding process of a plurality of code blocks, or a number of code blocks on which decoding fails continuously may occur. In this case, the early termination checker 440 may consider to execute a second operation mode of the mode of the early termination. This may be because power is wasted when decoding is sequentially performed up to a last-sequence code block which is high in possibility of a decoding fail, under a condition where decoding of most code blocks fails due to an excessive degradation in the channel. Also, this may be because, in a case where iterative decoding is performed by the maximum iteration number whenever decoding is performed up to a last code block, when unexpected delay occurs, the decoding termination time may not be observed.

In operation S650, the early termination checker 440 may generate a second control signal for activating the second operation mode of the early termination and may transmit the second control signal to the ECC decoder 410. The second operation mode may be a mode which skips decoding on code blocks, on which decoding is not yet performed, of the plurality of code blocks. For example, the second control signal may be generated at a time at which a decoding attempt on a 70th decoding block has been completed, in a process of sequentially decoding the 100 code blocks. (It is noted here that phrases such as "sequentially decoding" or "perform iterative decoding" are sometimes used herein loosely to refer to decoding attempts that either successfully decode a code block(s) or fail to decode a code block(s).) The ECC decoder 410 may omit an operation of performing decoding up to a 100th code block from a 71th code block in response to the second control signal. A selective skipping of sequential decoding based on the second operation mode of operation S650 will be described below with reference to FIG. 8.

FIG. 7 is a flowchart illustrating an operating method of the HDD checker 450 based on a first operation mode, according to embodiments.

Referring to FIG. 7, in operation S710, the ECC decoder 410 may receive a control signal indicating early termination from the early termination checker 440. In detail, the ECC decoder 410 may receive a first control signal indicating a first operation mode of the early termination. For example, when decoding of a (K-1)th code block fails, a first count value may increase by 1. When the increased first count value is greater than a first threshold value, the ECC decoder 410 may receive the first control signal. As another example, when decoding of the (K-1)th code block fails, a second count value may increase by 1. When the increased second count value is greater than a second threshold value, the ECC decoder 410 may receive the first control signal.

In operation S720, in response to the first control signal indicating the first operation mode, the ECC decoder 410 may start iterative decoding on a Kth code block. In operation S725, in response to the start of the iterative decoding, the ECC decoder 410 may set I to 1.

In operation S730, the ECC decoder 410 may perform ith decoding on the Kth code block to provide a decoding bit, which is an output of ith iterative decoding, to each of the CRC and PC checker 420 and the HDD checker 450. The CRC and PC checker 420 may calculate CRC and parity check for testing early stop, and the HDD checker 450 may calculate a matrix value for testing early give-up.

In operation S740, the CRC and PC checker 420 may determine whether the decoding bit, which is the output of the ith iterative decoding, passes the CRC and parity check. When the decoding bit passes the CRC and parity check, the CRC and PC checker 420 may proceed to operation S745 and may determine a decoding success of the Kth code block, and moreover, may proceed to operation S780 and may increase K by 1 to perform decoding on a next-sequence (K+1)th code block. On the other hand, when the decoding bit does not pass the CRC and parity check, the CRC and PC checker 420 may perform operation S750 for determining whether to continue the iterative decoding (perform a next decoding iteration) on the Kth code block up to a maximum iteration number.

In operation S750, the HDD checker 450 may calculate a matrix value, based on the decoding bit which is the output of the ith iterative decoding, and may determine whether the matrix value is greater than a threshold value. The matrix value may be a value for determining whether the decoding bit diverges or converges in a process of repeatedly decoding the Kth code block.

According to an embodiment, an ith decoding bit of a code block, which is an output of pth iterative decoding on the Kth code block and is hard-decided to 0 and 1, may be defined as $$c_i^l.$$

A result of majority vote (MV), performed on an output $$c_i^{p'} \ (p - w \le p' \le p - 1)$$

of when iterative decoding before the pth iterative decoding is being performed on the ith decoding bit by a w number, may be expressed as the following Equation 1.

$$C_{MV,i}^P = \begin{cases} 0, & \text{for } \sum_{k=1}^{w} c_i^{p-k} < \dfrac{w}{2} \\ 1, & \text{else} \end{cases} \qquad \text{[Equation 1]}$$

In equation 1, $$C_{MV,i}^p$$

may be a result of MV performed on a decoding output when iterative decoding before the pth iterative decoding is being performed on the ith decoding bit by the w number. The matrix value of a criterion for determining whether a certain value is greater than a threshold value by using the HDD checker 450 may be a value obtained by accumulating a difference between the MV result of Equation 1 and a current decoded bit on all decoded bits in the pth iterative decoding. When the matrix value is $$M_c^p,$$

the matrix value may be expressed as the following Equation 2.

$$M_c^P = \sum_{i=0}^{N-1} C_{MV,i}^P \oplus c_i^p \qquad \text{[Equation 2]}$$

Here, $\oplus$ denotes an exclusive-OR operator. Whenever iterative decoding is performed by the ECC decoder 410, the HDD checker 450 may calculate $$M_c^p$$

of the matrix value and may compare the calculated $$M_c^p$$

with a threshold value $\gamma_c$. In this case, when $$M_c^p$$

is not calculated because p is p<w, for convenience (e.g., an approximation of an ideal calculation), $$M_c^p$$

may be regarded as 0.

For example, when it is determined in operation S750 that the matrix value $$M_c^p$$

is greater than the threshold value $\gamma_c$, operation S755 may be performed. In operation S755, the ECC decoder 410 may selectively skip remaining iterative decoding on the Kth code block. To this end, the HDD checker 450 may provide the ECC decoder 410 with a control signal representing that the matrix value is greater than the threshold value, and the ECC decoder 410 may skip iterative decoding up to a residual iteration number (skip residual iterations) in iterative decoding on the Kth code block, based on the control signal, and may give up decoding on the Kth code block. The ECC decoder 410 may proceed to operation S770 to determine that decoding of the Kth code block fails and may proceed to operation S780 to determine whether decoding of a next-sequence (K+1)th code block will succeed or fail. This may be because, when the matrix value is greater than the threshold value $\gamma_c$, the decoding bit may not converge despite the ECC decoder 410 repeatedly decoding the Kth code block. Here, the HDD checker 450 may determine that there is a high possibility that decoding of the Kth code block fails even when iterative decoding is performed up to a maximum iteration number and may provide the ECC decoder 410 with a control signal for giving up iterative decoding early. For example, it may be assumed that a maximum iteration number allocated to each code block is 10. The HDD checker 450 may determine whether a result of fourth iterative decoding converges based on Equation 1 and Equation 2 and may determine that a hard-decision value does not converge, based on a result of the determination. In this regard, when Equation 1 and Equation 2 are calculated by using the result of the fourth iterative decoding, it may be determined that the matrix value $$M_c^p$$

is greater than the threshold value $\gamma_c$. The ECC decoder 410 may give up and skip an operation of performing the other six iterations of iterative decoding. In this case, the Kth code block may be processed as a block on which decoding fails.

On the other hand, when the matrix value $$M_c^p$$

is less than the threshold value $\gamma_c$ in operation S750, the HDD checker 450 may determine that a decoding result is converging. Accordingly, the HDD checker 450 may determine that there is a possibility that decoding succeeds and may not skip next-sequence iterative decoding. For example, when the matrix value $$M_c^p$$

is not greater than the threshold value, the ECC decoder 410 may determine whether an i value reaches the maximum iteration number, in operation S760. When the i value reaches the maximum iteration number, the maximum number of decoding iterations allocated to the Kth code block may have been performed, without passing CRC and parity check, and thus, the ECC decoder 410 may proceed to operation S770 to determine that a decoding fail of the Kth code block has occurred and may newly start iterative decoding on a next-sequence (K+1)th code block. When the i value does not reach the maximum iteration number in operation S760, an iterative decoding number allocated to the Kth code block may still remain, and thus, the ECC decoder 410 may determine that there is no reason for stopping iterative decoding of the Kth code block, may proceed to operation S765 to increase the i value by one, and may perform next i+1th decoding on the Kth code block.

In the embodiment described above, the threshold value $\gamma_c$ has been described as a fixed value, but is not limited thereto. According to various embodiments, the threshold value $\gamma_c$ may vary based on the i value. For example, the threshold value $\gamma_c$ may be set to be inversely proportional to i. That is, the threshold value $\gamma_c$ may be set to be large at an initial step of iterative decoding performed on the Kth code block. Subsequently, in a case where the ECC decoder 410 performs a number of iterative decoding on the Kth code block, the threshold value $\gamma_c$ may be reduced. The threshold value $\gamma_c$ may decrease as iterative decoding is performed, and thus, a skip of iterative decoding of the Kth code block may be determined earlier than when the threshold value $\gamma_c$ is set to a fixed value.

In the embodiment described above, it has been described that the HDD checker 450 calculates the matrix value $$M_c^p$$

and determines whether to skip iterative decoding, based on a comparison result obtained by comparing the matrix value with the threshold value $\gamma_c$, but the inventive concept is not limited thereto. According to various embodiments, the HDD checker 450 may determine a skip of iterative decoding, based on only a variation of the matrix value $$M_c^p.$$

For example, the HDD checker 450 may count the number of times the matrix value $$M_c^p$$

obtained for each iterative decoding increases continuously. When the number of times the matrix value $$M_c^p$$

increases continuously is greater than a threshold number, the HDD checker 450 may determine a skip of iterative decoding. The reason that the matrix value $$M_c^p$$

increases as iterative decoding is performed may be because there is a high possibility that the matrix value $$M_c^p$$

increases continuously and diverges even when iterative decoding is performed on the Kth code block up to the maximum iteration number. However, an embodiment which determines whether the number of times the matrix value $$M_c^p$$

increases continuously is greater than the threshold number may be used independently of or simultaneously with an embodiment which determines whether the matrix value $$M_c^p$$

described above is greater than the threshold value Yc.

Figure 8:
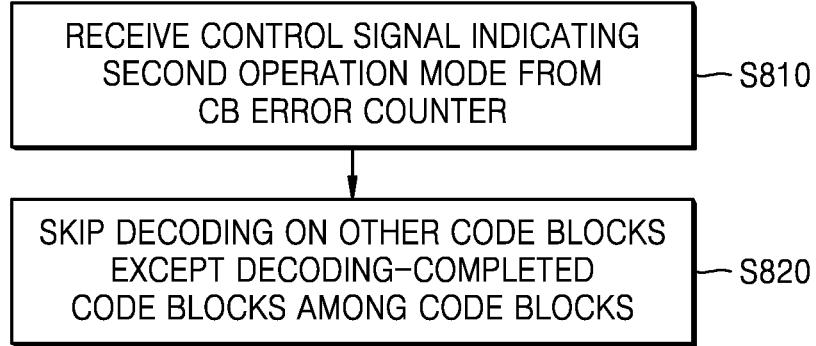
FIG. 8 is a flowchart illustrating an operating method of a decoding circuit based on a second operation mode, according to embodiments.

FIG. 8 is a flowchart illustrating an operating method of the ECC decoder 410 based on a second operation mode, according to embodiments.

Referring to FIG. 8, in operation S810, the ECC decoder 410 may receive a second control signal indicating the second operation mode from the CB error counter 430. For example, when decoding of a (K-1)th code block fails, a first count value may increase by 1. In this case, a decoding fail of the (K-1)th code block may be based on a skip of iterative decoding. When the increased first count value is greater than a third threshold value, the ECC decoder 410 may receive the second control signal. Likewise, when decoding of the (K-1)th code block fails, a second count value may increase by 1. When the increased second count value is greater than a fourth threshold value, the ECC decoder 410 may receive the second control signal.

In operation S820, the ECC decoder 410 may skip decoding on the other code blocks except decoding-completed code blocks among the plurality of code blocks. For example, at a time at which the second control signal is received, the (K-1)th code block may be in a decoding-completed state, and a last code block from the Kth code block may be in a state where decoding is not yet performed. The ECC decoder 410 may not perform and may skip decoding up to the last code block from the Kth code block.

Figure 9:
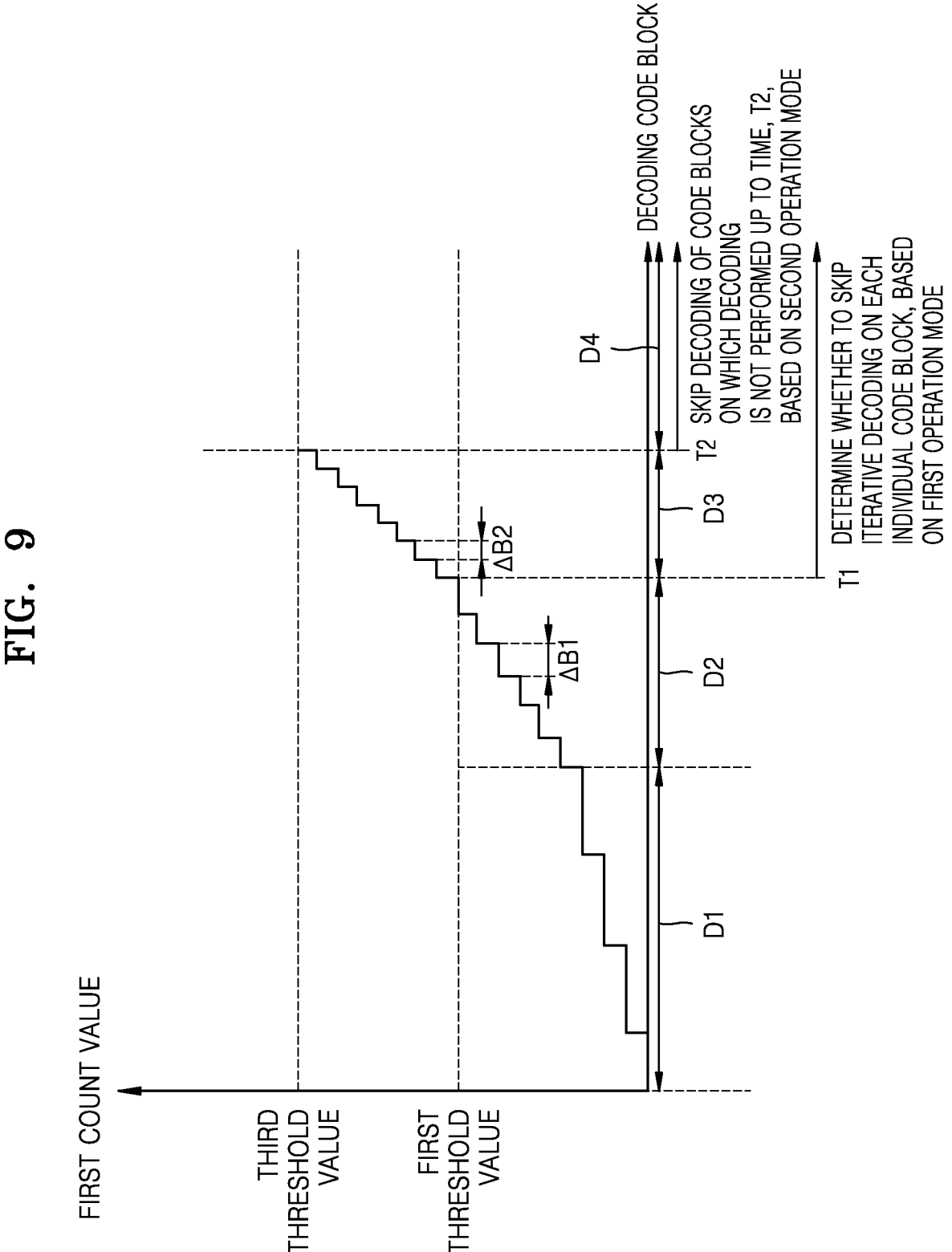
FIG. 9 is a graph showing a first count value based on sequential decoding, according to an embodiment.

FIG. 9 is a graph showing a first count value based on sequential decoding, according to an embodiment.

Referring to FIG. 9, the first count value may intermittently increase in a first period D1. The first period D1 may be a period where a channel state is good. For example, the ECC decoder 410 may sequentially decode a plurality of code blocks during the first period D1, and code blocks on which decoding has failed three times may be detected in the first period D1.

A first count value may quickly increase in a second period D2. The second period D2 may be a period where a channel state is rapidly degraded. For example, the ECC decoder 410 may experience a decoding fail of a code block five times during the second period D2. The first count value may continuously increase and may exceed a first threshold value at a first time T1. Accordingly, at the first time T1, the early termination checker 440 may generate a first control signal indicating a first operation mode and may transfer the first control signal to the ECC decoder 410 and the HDD checker 450. The HDD checker 450 may be activated based on the first control signal, and thus, may receive a decoding bit from the ECC decoder 410 and may determine whether to skip iterative decoding (e.g., when the matrix value is greater than the threshold value in operation S750 of FIG. 7) before a maximum iteration number for each individual code block.

In a third period D3, the ECC decoder 410 may receive a control signal indicating a skip of iterative decoding from the HDD checker 450 and may skip the iterative decoding. For instance, it may be seen that a decoding time ΔB2 taken for each code block of the third period D3 is shorter than a decoding time ΔB1 taken for each code block of the second period D2 before entering the first operation mode. This may be caused because decoding has not been performed by the maximum iteration number capable of being performed for each code block and iterative decoding is previously skipped. When it is determined that iterative decoding is skipped for each code block and decoding fails in the first operation mode in the third period D3, the first count value may quickly increase again. Accordingly, at a second time T2, the early termination checker 440 may generate a second control signal indicating a second operation mode and may transfer the second control signal to the ECC decoder 410. The ECC decoder 410 may skip decoding on code blocks on which decoding is not performed, based on the second control signal. That is, in a fourth period D4 after the second time T2, the ECC decoder 410 may not perform decoding on a code block.

Figure 10:
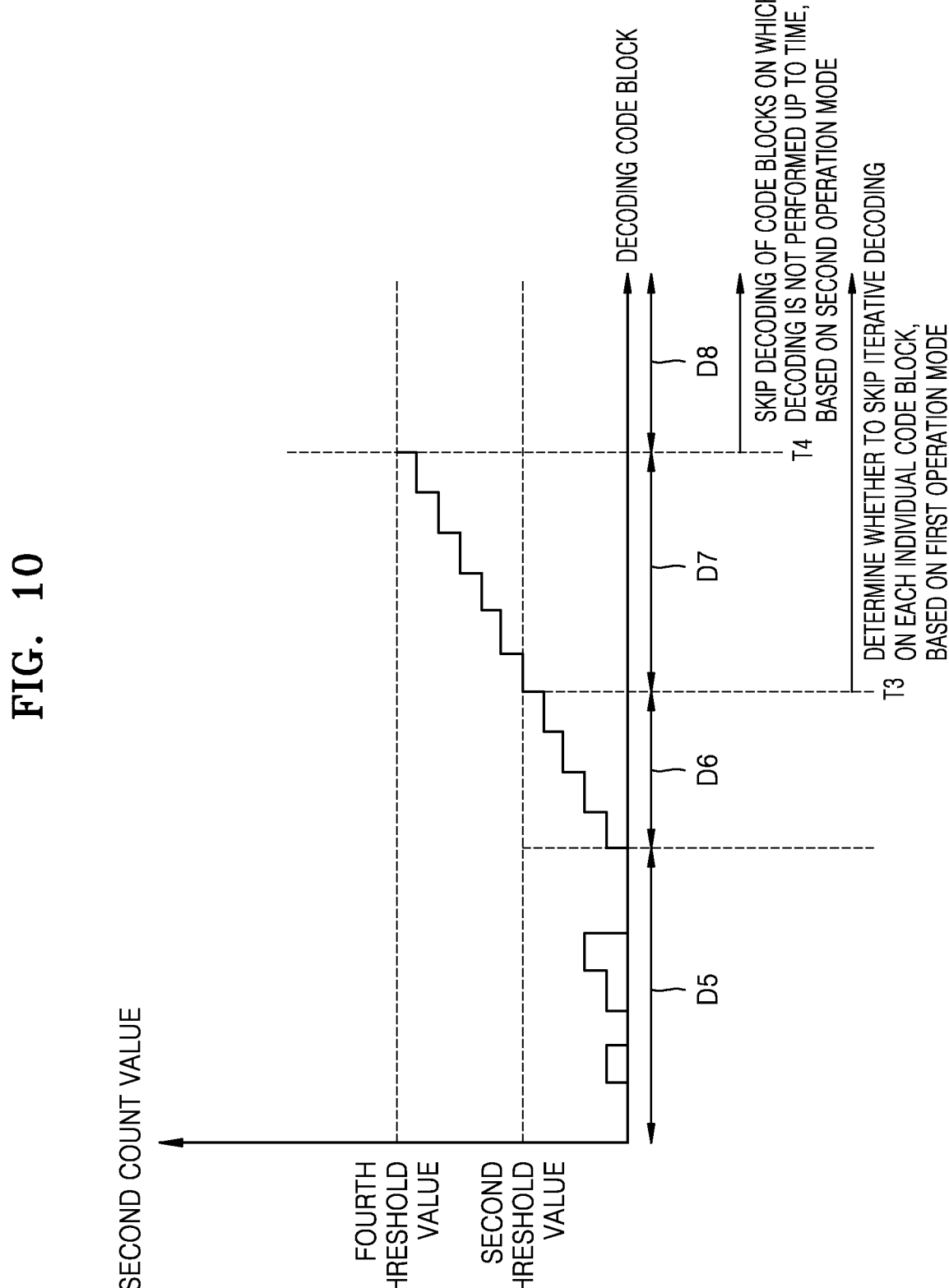
FIG. 10 is a graph showing a second count value based on sequential decoding, according to an embodiment.

FIG. 10 is a graph showing a second count value based on sequential decoding, according to an embodiment.

Referring to FIG. 10, in a fifth period D5, the second count value may intermittently increase and then may return to 0 again. The fifth period D5 may be a period where a channel state is good. For example, the ECC decoder 410 may sequentially decode a plurality of code blocks during the fifth period D5, and it may be seen that a continuous decoding fail barely occurs in the fifth period D5. It may be seen that, even when a continuous decoding fail occurs, decoding of a next-sequence code block succeeds and the second count value returns to 0 again.

The second count value may quickly increase in a sixth period D6. The sixth period D6 may be a period where a channel state is rapidly degraded. For example, the ECC decoder 410 may experience a decoding fail of code blocks five times during the sixth period D6. The second count value may continuously increase and may exceed a second threshold value at a third time T3. Accordingly, at the third time T3, the early termination checker 440 may generate the first control signal indicating the first operation mode and may transfer the first control signal to the ECC decoder 410 and the HDD checker 450. The early termination checker 440 may be activated based on the first control signal, and thus, may receive a decoding bit from the ECC decoder 410 and may determine whether to skip iterative decoding before the maximum iteration number for each individual code block.

In a seventh period D7, the ECC decoder 410 may receive a control signal indicating a skip of iterative decoding from the HDD checker 450 and may skip the iterative decoding. When it is determined that iterative decoding is skipped for each code block and decoding fails in the first operation mode in the seventh period D7, the second count value may continuously increase. Accordingly, at a fourth time T4, the early termination checker 440 may generate the second control signal indicating the second operation mode and may transfer the second control signal to the ECC decoder 410. The ECC decoder 410 may skip decoding on code blocks on which decoding is not performed, based on the second control signal. For instance, in an eighth period D8 after the fourth time T4, the ECC decoder 410 may not perform decoding on remaining code blocks of the transport block.

Figure 11:
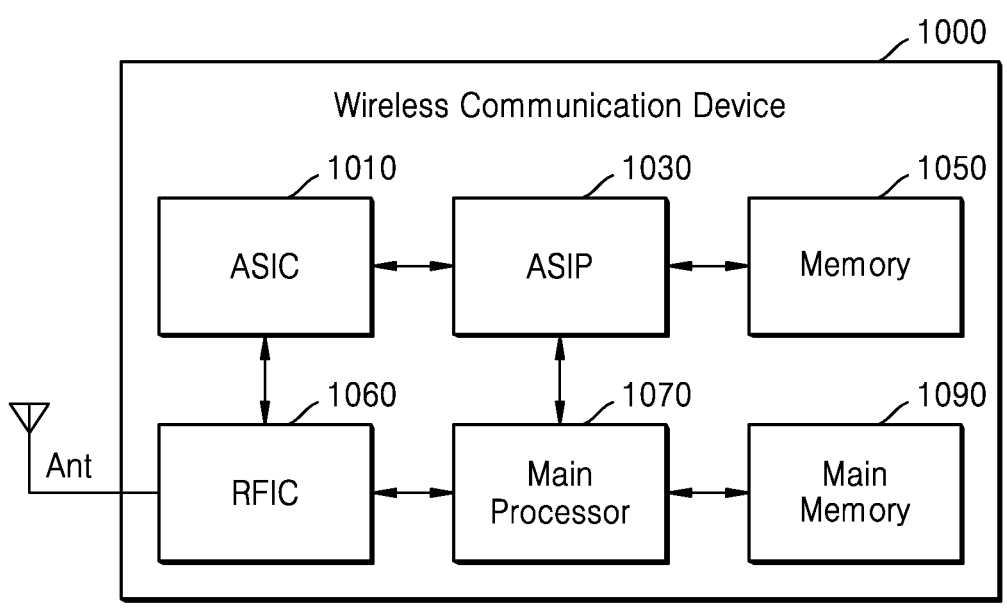
FIG. 11 is a block diagram of a wireless communication device according to an embodiment.

FIG. 11 is a block diagram of a wireless communication device 1000 according to an embodiment.

Referring to FIG. 11, the wireless communication device 1000 may include a modem (not shown) and a radio frequency integrated circuit (RFIC) 1060, and the modem may include an application specific integrated circuit (ASIC) 1010, an application specific instruction set processor (ASIP) 1030, a memory 1050, a main processor 1070, and a main memory 1090. The wireless communication device 1000 of FIG. 11 may be a reception device 200 according to an embodiment.

The RFIC 1060 may be connected with an antenna Ant and may receive a signal from the outside or may transmit a signal to the outside by using a wireless communication network. The ASIP 1030 may be an integrated circuit which is customized for the specific use, and moreover, may support a dedicated instruction set for a specific application and may execute an instruction included in the instruction set. The memory 1050 may be a non-transitory storage device, and moreover, may communicate with the ASIP 1030 and may store a plurality of instructions executed by the ASIP 1030. For example, in a non-limiting embodiment, the memory 1050 may include an arbitrary type of memory accessible by the ASIP 1030, like random access memory (RAM), read only memory (ROM), a tape, a magnetic tape, an optical disk, a volatile memory, a non-volatile memory, and a combination thereof.

The main processor 1070 may execute the plurality of instructions to control the wireless communication device 1000. For example, the main processor 1070 may control the ASIC 1010 and the ASIP 1030 and may process data received over a wireless communication network or may process an input of a user on the wireless communication device 1000. For example, the main processor 1070 may set an operation mode for the early termination of the ECC decoder 410. The main processor 1070 may determine a first operation mode or a second operation mode of an operation mode for early termination, based on a decoding fail number of a plurality of code blocks. The ECC decoder 410 operating in the first operation mode may give up an iterative decoding number and may quickly determine a decoding fail whenever decoding a code block, and the ECC decoder 410 operating in the second operation mode may skip decoding on blocks, on which decoding is not performed, of the plurality of code blocks. Accordingly, the wireless communication device 1000 may decrease an operation time of the ECC decoder 410 and may reduce power consumption even without a reduction in throughput of code blocks on which decoding is skipped, based on HARQ retransmission.

The main memory 1090 may be a non-transitory storage device, and moreover, may communicate with the main processor 1070 and may store a plurality of instructions executed by the main processor 1070. For example, in a non-limiting embodiment, the main processor 1090 may include an arbitrary type of memory accessible by the main processor 1070, like RAM, ROM, a tape, a magnetic tape, an optical disk, a volatile memory, a non-volatile memory, and a combination thereof.

Figure 12A:
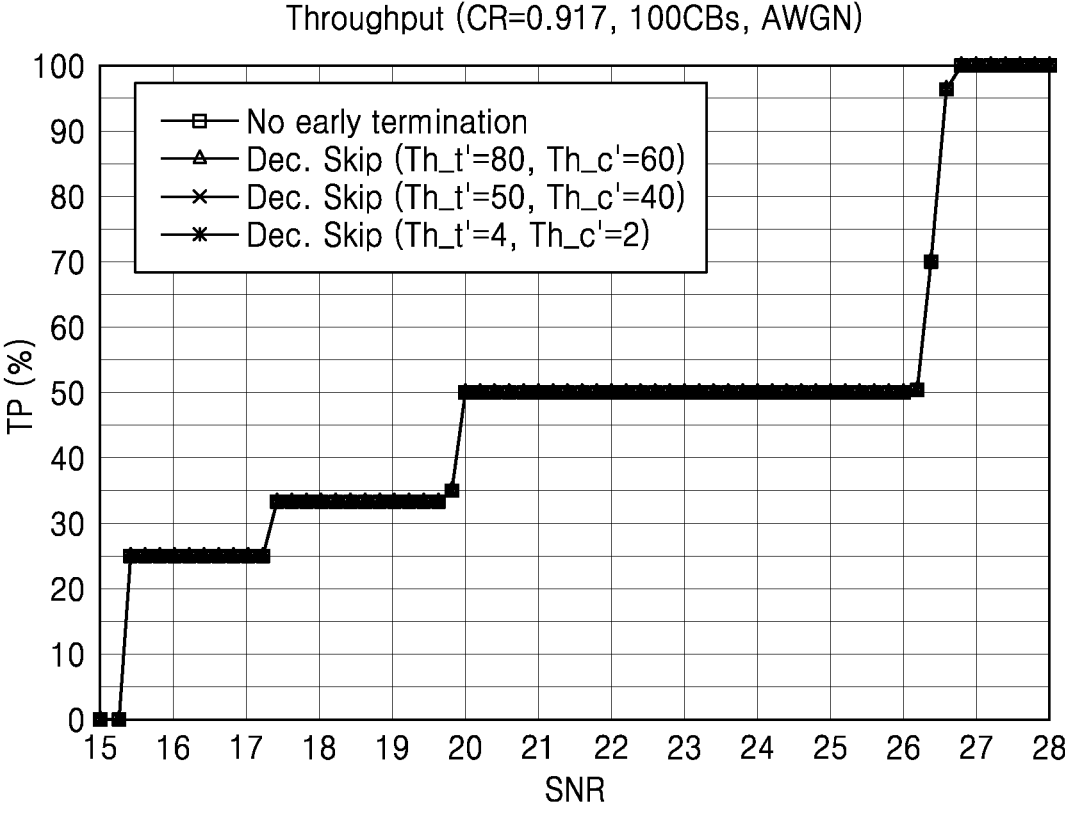
FIG. 12A is a graph for comparing throughput results according to an embodiment.

FIG. 12A is a graph for comparing a throughput result according to an embodiment.

Referring to FIG. 12A, throughput based on a signal to noise ratio (SNR) is illustrated. In the graph of FIG. 12A, it may be assumed that a HARQ transmission technique is used, one transport block includes 100 code blocks, each of the code blocks is encoded by the LDPC technique, and a code word corresponding to a code rate of about 0.917 is modulated based on 256 quadrature amplitude modulation (QAM).

As seen in FIG. 12A, a throughput result for when a sequential decoding skip scheme based on the second operation mode is used has been compared with a throughput result for when early termination (a skip of iterative decoding based on the first operation mode or a skip of sequential decoding based on the second operation mode) is not applied. In the example, when the early termination is not applied, the reception device 200 may repeatedly perform decoding by a maximum iteration number for each 100 code blocks. In FIG. 12A, it may be seen that throughput loss does not occur even when a threshold value (Th_t' of FIG. 12A) and a fourth threshold value (Th_c' of FIG. 12A) of a second condition for determining a skip of sequential decoding are changed. Thus, even when decoding of the other code blocks on which decoding is not performed is skipped at a time at which the second condition is satisfied, the same throughput as a case where decoding is performed up to the 100 code blocks may be realized. This may be because a total transport block is retransmitted based on the HARQ transmission technique, when a decoding fail occurs in one code block configuring the retransmitted transport block. For example, in a case where a decoding fail occurs in only some code blocks, when a transport block is retransmitted at the same SNR in an additive white Gaussian noise (AWGN) environment, decoding of the retransmitted transport block may succeed at a probability near 100%, and thus, even when the number of code blocks on which sequential decoding is skipped increases as the third threshold value or the fourth threshold value is set to be small, throughput may be constant in terms of a decoding success of the transport block.

Figure 12B:
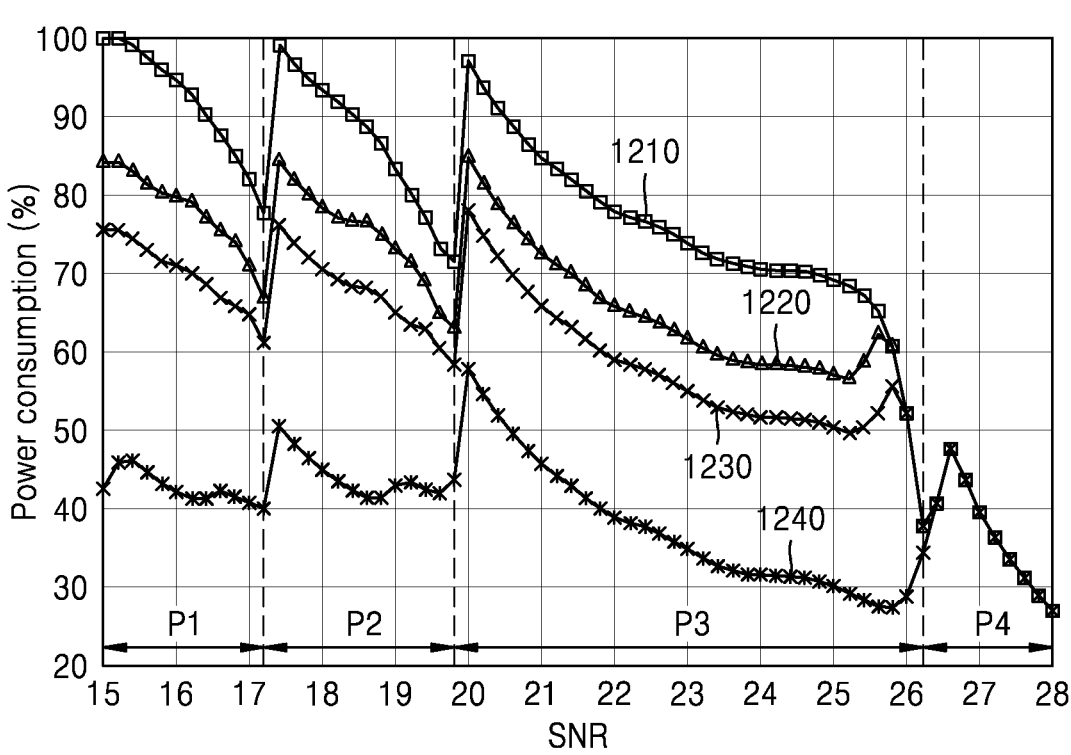
FIG. 12B is a graph for comparing power consumption according to an embodiment.

FIG. 12B is a graph for comparing power consumption according to an embodiment.

Referring to FIG. 12B, power consumption based on an SNR is shown. In the graph of FIG. 12B, like the graph of FIG. 12A, it may be assumed that the HARQ transmission technique is used, one transport block includes 100 code blocks, each of the code blocks is encoded by the LDPC technique, and a code word corresponding to a code rate of about 0.917 is modulated based on the 256 QAM.

Referring to FIG. 12B, first to fourth periods P1 to P4 may be set based on an SNR. The first period P1 may be a period where a channel state is very bad, and a channel state may be improved progressively toward the fourth period P4 from the first period P1. A first result 1210 shows power consumption of when early termination is not applied, a second result 1220 shows power consumption of when a third threshold value is set to 80 and a fourth threshold value is set to 60, a third result 1230 shows power consumption of when the third threshold value is set to 50 and the fourth threshold value is set to 40, and a fourth result 1240 shows power consumption of when the third threshold value is set to 4 and the fourth threshold value is set to 2.

The power consumption of the first result 1210 may be highest in the first to third periods P1 to P3, and power consumption may be progressively reduced in the order of the second result 1220, the third result 1230, and the fourth result 1240. This may be because decoding is performed by the maximum iteration number for each code block without applying early termination and all decoding is performed up to a last code block, and thus, an operation time of the ECC decoder 410 is longest. Comparing the second to fourth results 1220 to 1240, it may be seen that the power consumption of the fourth result 1240 where a skip of sequential decoding starts early is lowest as the third threshold value and the fourth threshold value are set to be low, despite an operation performed in the second operation mode. In a period where an SNR is high because a channel state is good like the fourth period P4, because there is no code block on which decoding fails, the power consumption of the first to fourth results 1210 and 1240 may be equal to one another.

Figure 12C:
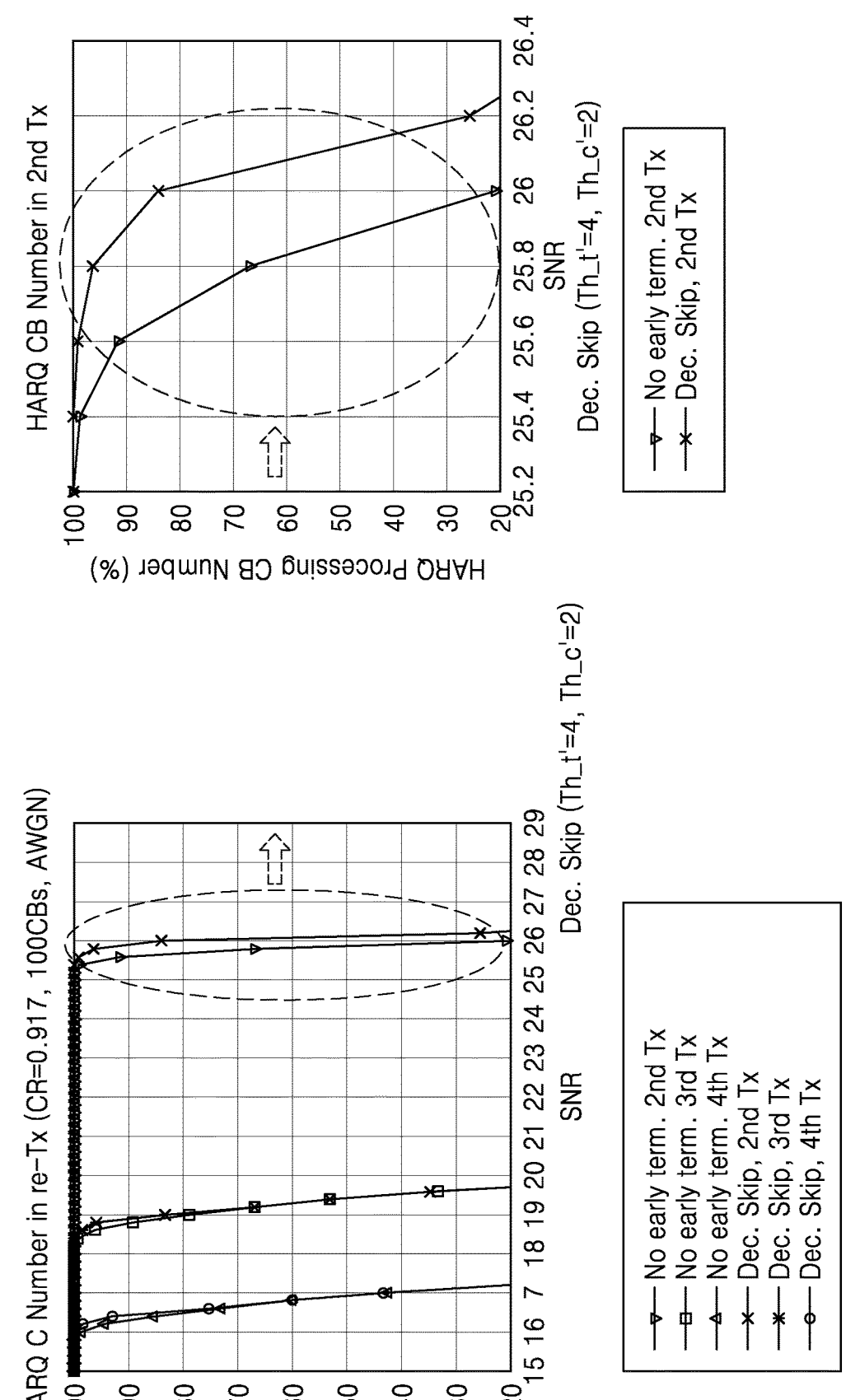
FIG. 12C is a graph for comparing power consumption according to an embodiment.

FIG. 12C is a graph for comparing power consumption according to an embodiment.

Referring to FIG. 12C, the number of retransmitted code blocks based on an SNR is shown. In the graph of FIG. 12C, like the graph of FIG. 12A, it may be assumed that the HARQ transmission technique is used, one transport block includes 100 code blocks, each of the code blocks is encoded by the LDPC technique, and a code word corresponding to a code rate of about 0.917 is modulated based on the 256 QAM. Also, it has been described that a total transport block is retransmitted even when a decoding fail occurs in only one code block in the transport block, but in FIG. 12C, it may be assumed that only a code block on which decoding fails may be retransmitted. A third threshold value of a second operation mode of FIG. 12C may be set to 4, and a fourth threshold value may be set to 2. The number of code blocks which has to be retransmitted based on an SNR of about 17 dB may be rapidly reduced in fourth retransmission (4th Tx), the number of code blocks which has to be retransmitted based on an SNR of about 20 dB may be rapidly reduced in third retransmission (3rd Tx), and the number of code blocks which has to be retransmitted based on an SNR of about 26 dB may be rapidly reduced in second retransmission (2nd Tx). That is, as HARQ retransmission is more and more performed, decoding of a transport block may succeed even when a channel state is bad. However, in early termination where sequential decoding is skipped, it may be seen that relatively more code blocks have to be retransmitted. For example, it may be seen that, in a case (no early term) where the early termination is not applied in 26 dB of the second retransmission (2nd Tx), the number of retransmitted code blocks is 20%, but in a case (sequential decoding skip) where an operation is performed in the second operation mode as the early termination is applied, the number of retransmitted code blocks is 84%. In HARQ retransmission, because a code block on which decoding fails has to be stored up to retransmission, an additional memory may be needed and a processing time taken in soft-combining and again performing decoding is needed, an increase in the number of retransmitted code blocks may adversely affect performance. Also, in a 5G system, HARQ retransmission may be used by code block group (CBG) units. In this case, a possibility that the number of code blocks retransmitted from a base station is reduced as the number of code blocks on which decoding has succeeded in initial transmission increases may be high, and thus, the efficiency of use of transmission resources may increase.

That is, in a case which uses only a skip of sequential decoding through the early termination, a second threshold value of a first condition and a fourth threshold value of a second condition for determining an operation mode of the early termination may be set to be low, and thus, power consumption may be reduced. However, the number of retransmitted code blocks may increase, and due to this, the inefficiency of resource use may occur. Accordingly, as in FIG. 13A, when an operation of skipping iterative decoding is used, the number of code blocks may decrease, and power consumption may be reduced.

Figure 13A:
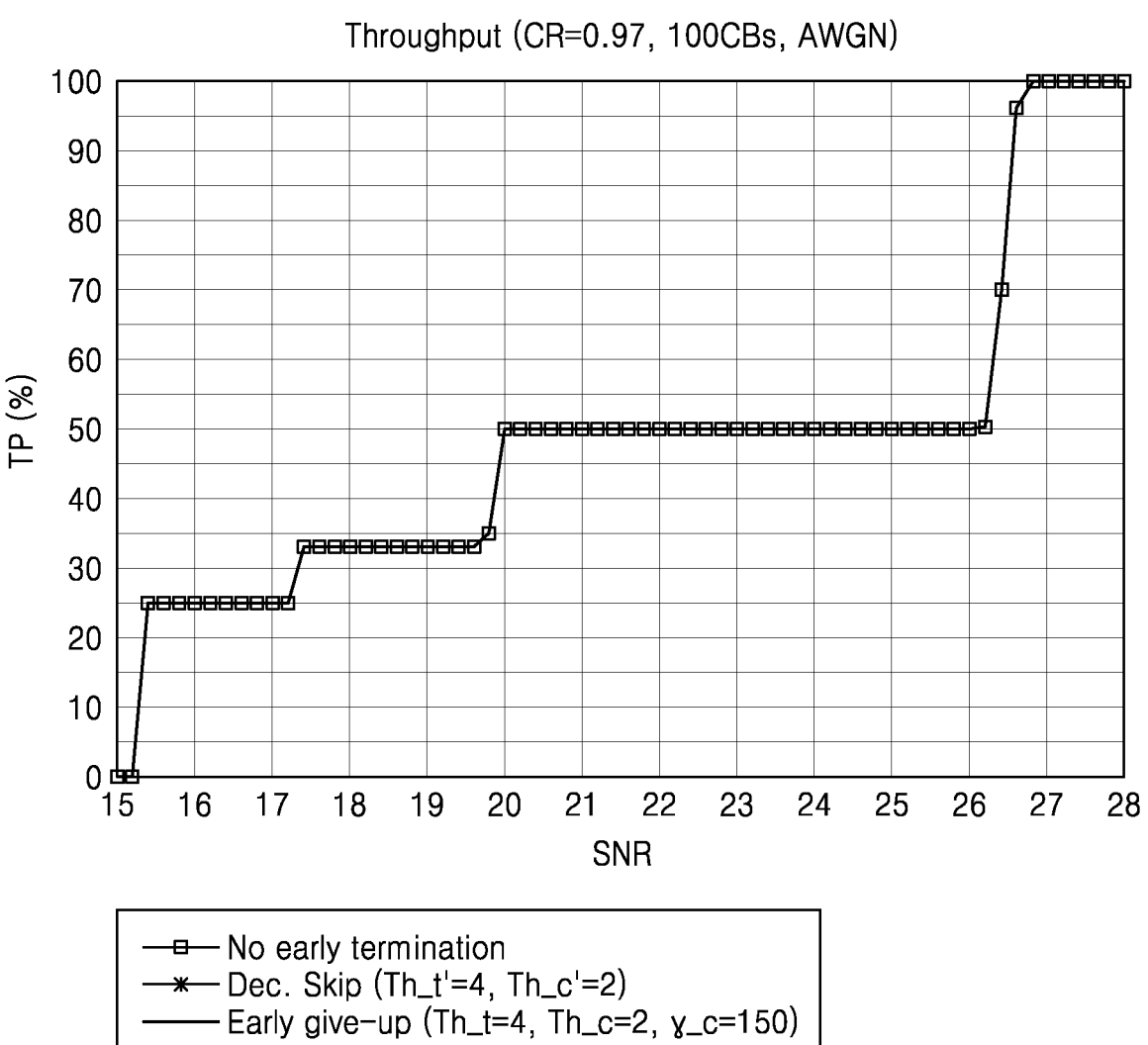
FIG. 13A is a graph for comparing throughput results according to an embodiment.

FIG. 13A is a graph for comparing a throughput result according to an embodiment.

Referring to FIG. 13A, a throughput result based on SNR is illustrated. In the graph of FIG. 13A, it may be assumed that the HARQ transmission technique is used, one transport block includes 100 code blocks, each of the code blocks is encoded by the LDPC technique, and a code word corresponding to a code rate of about 0.917 is modulated based on the 256 QAM.

Referring to FIG. 13A, a throughput result for when an iterative decoding skip scheme based on a first operation mode is used, a throughput result for when a sequential decoding skip scheme based on a second operation mode is used, and a throughput of when early termination (a skip of iterative decoding based on the first operation mode or a skip of sequential decoding based on the second operation mode) is not applied may be compared with one another. A first threshold value of a first condition for determining a skip of iterative decoding may be set to 4, a second threshold value of the first condition may be set to 2, a third threshold value of a second condition for determining a skip of sequential decoding may be set to 4, and a fourth threshold value of the second condition may be set to 2.

Comparing with a throughput based on an SNR, it may be seen that a throughput is constant regardless of performing the early termination. That is, it may be seen that, when the other iteration number is skipped without performing iterative decoding up to the maximum iteration number for each code block in the first operation mode or decoding of the other code blocks on which decoding is not performed is skipped without sequentially performing decoding on all code blocks in the second operation mode, a throughput is not affected in terms of a transport block.

Figure 13B:
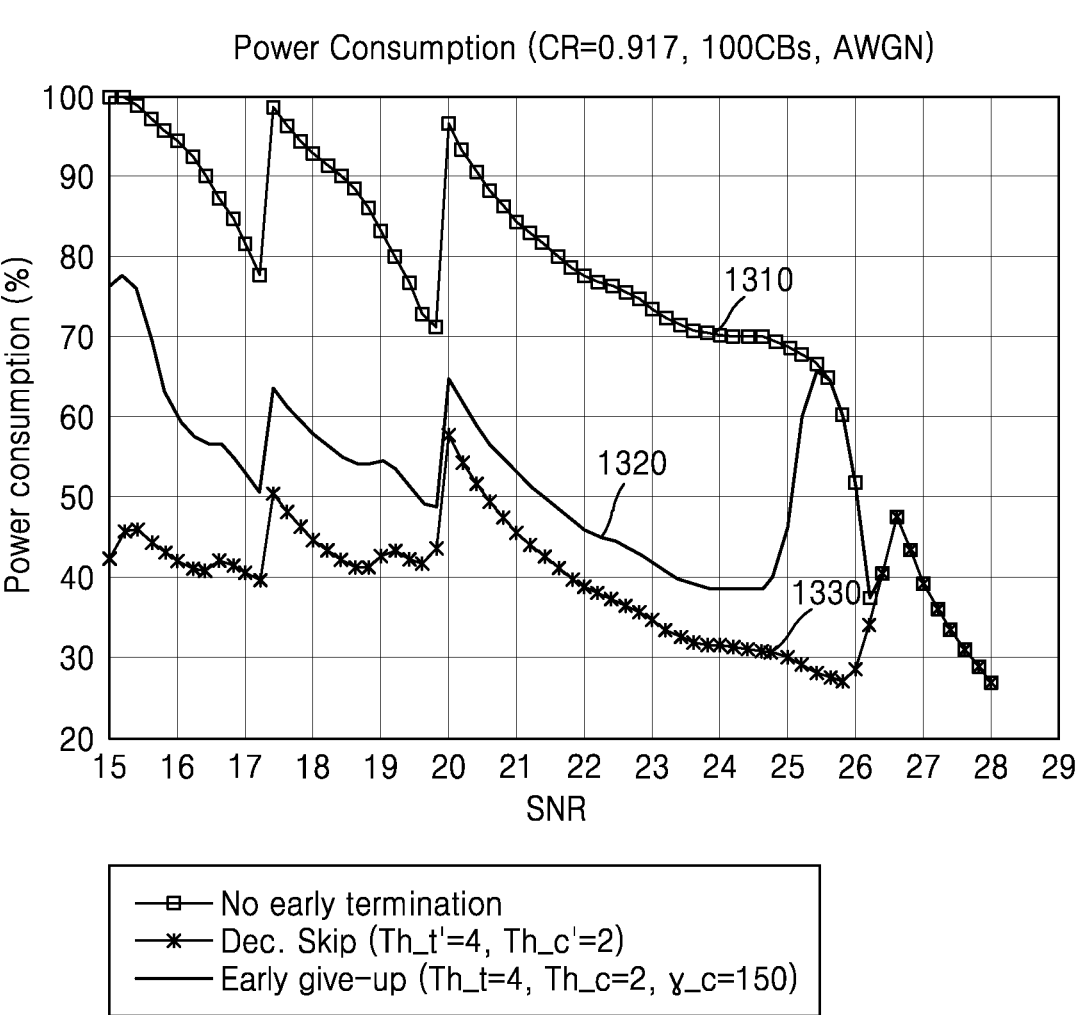
FIG. 13B is a graph for comparing power consumption according to an embodiment.

FIG. 13B is a graph for comparing power consumption according to an embodiment.

Referring to FIG. 13B, power consumption based on an SNR is shown. In the graph of FIG. 13B, like the graph of FIG. 13A, it may be assumed that the HARQ transmission technique is used, one transport block includes 100 code blocks, each of the code blocks is encoded by the LDPC technique, and a code word corresponding to a code rate of about 0.917 is modulated based on the 256 QAM.

Referring to FIG. 13B, a first result 1310 shows power consumption of when early termination is not applied, a second result 1320 shows power consumption of when a first threshold value for determining a first condition is set to 4 and a second threshold value is set to 2, and a third result 1330 shows power consumption of when a third threshold value for determining a second condition is set to 4 and a fourth threshold value is set to 2.

Comparing the first result 1310 with the second result 1320 and the third result 1330, it may be seen that the power consumption of the first result 1310 is always greater than the power consumption of each of the second result 1320 and the third result 1330, except for a period (for example, an SNR of 26.5 dB or more) where a channel state is good. That is, the second result 1320 may be reduced in power consumption because the number of times the ECC decoder 410 performs iterative decoding on each code block, based on the first operation mode is reduced, and the third result 1330 may be reduced in power consumption because the ECC decoder 410 does not perform decoding of code blocks which are not yet decoded, based on the second operation mode.

Comparing the second result 1320 with the third result 1330, an effect of reducing power consumption based on the first operation mode may be less than an effect of reducing power consumption based on the second operation mode. That is, iterative decoding may be skipped based on the first operation mode and decoding may be performed up to a last code block, and in this case, an operation of skipping decoding on the other code blocks by skipping sequential decoding in the second operation mode may more effectively decrease the operation time and power consumption of the ECC decoder 410 than an operation of giving up the other iteration number for each code block.

Figure 13C:
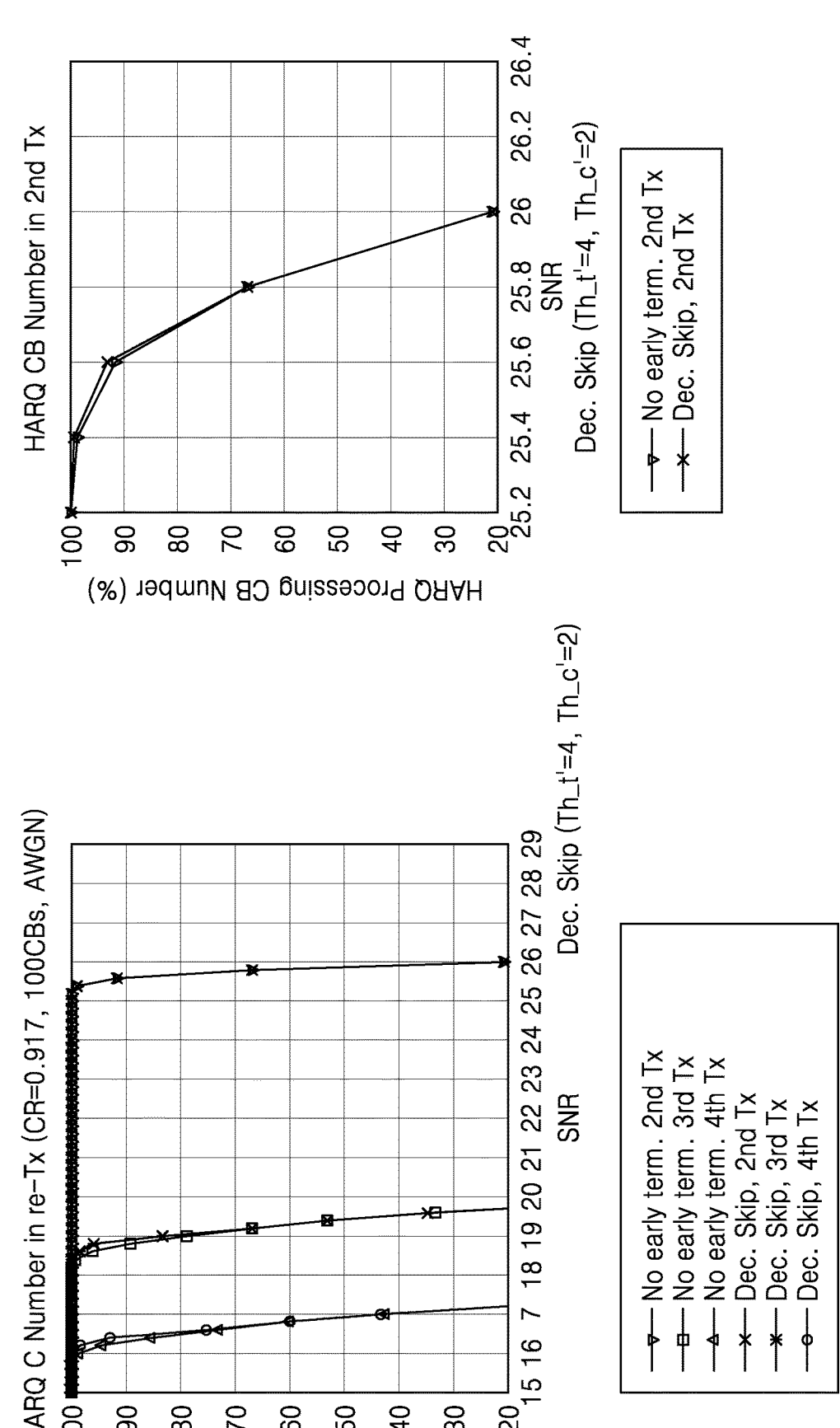
FIG. 13C is a graph for comparing power consumption according to an embodiment.

FIG. 13C is a graph for comparing power consumption according to an embodiment.

Referring to FIG. 13C, the number of retransmitted code blocks based on an SNR is shown. In the graph of FIG. 13C, like the graph of FIG. 12C, it may be assumed that the HARQ transmission technique is used, one transport block includes 100 code blocks, each of the code blocks is encoded by the LDPC technique, and a code word corresponding to a code rate of about 0.917 is modulated based on the 256 QAM. Also, it has been described that a total transport block is retransmitted even when a decoding fail occurs in only one code block in the transport block, but in FIG. 13C, it may be assumed that only a code block on which decoding fails may be retransmitted. A first threshold value of a first operation mode of FIG. 13C may be set to 4, and a second threshold value may be set to 2. The number of code blocks which has to be retransmitted based on an SNR of about 17 dB may be rapidly reduced in fourth retransmission (4th Tx), the number of code blocks which has to be retransmitted based on an SNR of about 20 dB may be rapidly reduced in third retransmission (3rd Tx), and the number of code blocks which has to be retransmitted based on an SNR of about 26 dB may be rapidly reduced in second retransmission (2nd Tx). That is, as HARQ retransmission is more and more performed, decoding of a transport block may succeed even when a channel state is bad.

The number of retransmitted code blocks when iterative decoding is skipped based on a first operation mode of early termination may be substantially the same as the number of retransmitted code blocks when the early termination is not applied. For example, it may be seen that, in a case (no early term) where the early termination is not applied in 26 dB of the second retransmission (2nd Tx), the number of retransmitted code blocks is 20%, and in a case (early give-up) where an operation is performed in the first operation mode as the early termination is applied, the number of retransmitted code blocks is 20%.

That is, referring to FIGS. 12B and 13B, it may be seen that a skip of sequential decoding based on the second operation mode decreases power consumption in about 26.2 dB or less, and a skip of iterative decoding based on the first operation mode decreases power consumption in about 25.5 dB or less. Also, comparing with the skip of the sequential decoding based on the second operation mode, the skip of the iterative decoding based on the first operation mode may be relatively less in effect of reducing power consumption, or may prevent an increase in the number of retransmitted code blocks.

Hereinabove, exemplary embodiments have been described in the drawings and the specification. Embodiments have been described by using the terms described herein, but this has been merely used for describing the inventive concept and has not been used for limiting a meaning or limiting the scope of the inventive concept defined in the following claims. Therefore, it may be understood by those of ordinary skill in the art that various modifications and other equivalent embodiments may be implemented from the inventive concept. Accordingly, the scope of the inventive concept may be defined based on the scope of the following claims.

While the inventive concept has been particularly shown and described with reference to embodiments thereof, it will be understood that various changes in form and details may be made therein without departing from the spirit and scope of the following claims.

What is claimed is:

1. An operating method of a decoder device included in a reception device of a multiple input multiple output (MIMO) communication system, the operating method comprising:

receiving a transport block including a plurality of code blocks from a transmission device;

performing sequential decoding on at least some of the plurality of code blocks, the sequential decoding including iterative decoding on individual code blocks of the plurality of code blocks up to a maximum iteration number of decoding iterations per code block;

performing cyclic redundancy check (CRC) and parity check (PC) to determine a decoding result on each code block;

monitoring the decoding result in real time to generate a count value of a decoding fail number of coding blocks; and determining whether to activate a first operation mode for selective skipping of subsequent iterative decoding and a second operation mode for selective skipping of subsequent sequential decoding on one or more remaining code blocks of the transport block, based on the count value.

2. The operating method of claim 1, wherein the count value comprises a first count value obtained by summing decoding fail numbers of previously decoding-attempted code blocks or a second count value indicating a continuous decoding fail number of previously decoding-attempted code blocks.

3. The operating method of claim 2, wherein the determining comprises determining whether the first count value is greater than a first threshold value or the second count value is greater than a second threshold value; and when the first count value is greater than the first threshold value or the second count value is greater than the second threshold value, skipping the subsequent iterative decoding by not performing remaining decoding iterations up to the maximum number of decoding iterations for each code block, while sequentially decoding the plurality of code blocks.

4. The operating method of claim 3, wherein the determining comprises determining whether the first count value is greater than a third threshold value or the second count value is greater than a fourth threshold value; and when the first count value is greater than the third threshold value or the second count value is greater than the fourth threshold value, skipping decoding on code blocks of the transport block on which decoding has not yet been attempted, of the plurality of code blocks.

5. The operating method of claim 4, wherein the first threshold value is less than the third threshold value, and the second threshold value is less than the fourth threshold value.

6. The operating method of claim 3, wherein the skipping of subsequent iterative decoding comprises:

performing decoding on a code block to obtain a hard-decision value;

determining whether the hard-decision value of the code block converges; and when it is determined that the hard-decision value does not converge, skipping residual iterative decoding up to the maximum number of decoding iterations on the code block.

7. The operating method of claim 6, further comprising:

performing cyclic redundancy check (CRC), based on a decoding bit which is a result of the iterative decoding;

performing parity check based on the decoding bit; and when the CRC and the parity check pass, determining that the decoding of the code block is successful.

8. The operating method of claim 1, wherein the decoder device is configured to perform decoding based on one of a turbo code and a low density parity check (LDPC) code.

9. The operating method of claim 1, further comprising:

identifying at least one code block on which the iterative decoding or the sequential decoding has been skipped; and transmitting a signal of a retransmission request, corresponding to the identified code block, to a transmission device.

10. The operating method of claim 9, further comprising:

receiving a retransmission packet transmitted in response to the retransmission request;

soft-combining the retransmission packet and the identified code block; and performing decoding on the soft-combined at least one code block.

11. A decoder device included in a reception device of a multiple input multiple output (MIMO) communication system, the decoder device comprising:

an error correction code (ECC) decoder configured to receive a transport block including a plurality of code blocks through the reception device, perform sequential decoding on at least some of the plurality of code blocks, the sequential decoding including iterative decoding by up to a maximum iteration number on individual code blocks of the plurality of code blocks;

a cyclic redundancy check (CRC) and parity check (PC) checker configured to receive an output of the ECC decoder and perform CRC and PC to determine a decoding result on each code block;

an error counter configured to monitor the decoding result output from the CRC and PC checker to generate a count value of a decoding fail number of code blocks; and an early termination checker configured to receive the count value from the error counter to determine a first operation mode for selectively skipping the iterative decoding of the ECC decoder and a second operation mode for selectively skipping the sequential decoding.

12. The decoder device of claim 11, wherein the count value comprises a first count value obtained by summing decoding fail numbers of decoding-attempted code blocks or a second count value indicating a continuous decoding fail number of decoding-attempted code blocks.

13. The decoder device of claim 12, wherein the early termination checker is configured to determine whether the first count value is greater than a first threshold value or the second count value is greater than a second threshold value and, when the first count value is greater than the first threshold value or the second count value is greater than the second threshold value, provide the ECC decoder and a hard-decision difference (HDD) checker with a control signal indicating a first operation mode of skipping the iterative decoding by not performing the iterative decoding up to the maximum iteration number for each code block, while sequentially decoding the plurality of code blocks.

14. The decoder device of claim 13, wherein the early termination checker is configured to determine whether the first count value is greater than a third threshold value or the second count value is greater than a fourth threshold value and, when the first count value is greater than the third threshold value or the second count value is greater than the fourth threshold value, provide the ECC decoder with a control signal indicating a second operation mode of skipping decoding on code blocks, on which decoding has not yet been attempted, of the plurality of code blocks.

15. The decoder device of claim 14, wherein the first threshold value is less than the third threshold value, and the second threshold value is less than the fourth threshold value.

16. The decoder device of claim 13, wherein the HDD checker is configured to obtain a hard-decision value from the ECC decoder, determine whether the hard-decision value of the code block converges, and when it is determined that the hard-decision value does not converge, provide a control signal indicating skipping of residual iterative decoding up to the maximum iteration number on the code block.

17. The decoder device of claim 16, wherein the CRC and PC checker is configured to receive a decoding bit which is a result of the iterative decoding from the ECC decoder and, when CRC and PC based on the decoding bit pass, determine that the decoding on the code block is successful.

18. The decoder device of claim 11, wherein the ECC decoder is configured to be based on one of a turbo code and a low density parity check (LDPC) code.

19. The decoder device of claim 11, wherein the ECC decoder is further configured to identify at least one code block, on which the iterative decoding or the sequential decoding is skipped, and generate a signal of a retransmission request corresponding to the identified code block.

20. A wireless communication system, comprising:

a transmitting device configured to encode data based on one of a turbo code and a low density parity check (LDPC) code, and deserialize a serial bit string of the encoded data; and a receiving device configured to receive a transport block including a plurality of code blocks from the transmitting device, perform sequential decoding on at least some of the plurality of code blocks; the sequential decoding including iterative decoding on individual code blocks of the plurality of code blocks up to a maximum iteration number of decoding iterations per code block, perform cyclic redundancy check (CRC) and parity check (PC) to determine a decoding result on each code block, monitor the decoding result in real time to generate a count value of a decoding fail number of coding blocks, and determine whether to activate a first operation mode for selective skipping of subsequent iterative decoding and a second operation mode for selective skipping of subsequent sequential decoding on one or more remaining code blocks of the transport block, based on the count value.

\* \* \* \* \*